US012332816B1

(12) United States Patent
Choi

(10) Patent No.: US 12,332,816 B1
(45) Date of Patent: Jun. 17, 2025

(54) DYNAMIC ASSIGNMENT OF BUS BANDWIDTH FOR SENDING TENSORS TO NEURAL PROCESSING UNITS

(71) Applicant: DEEPX CO., LTD., Seongnam-si (KR)

(72) Inventor: Je Ik Choi, Pyeongtaek-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/037,189

(22) Filed: Jan. 25, 2025

(30) Foreign Application Priority Data

Aug. 26, 2024 (KR) ........................ 10-2024-0114593

(51) Int. Cl.
*G06F 13/18* (2006.01)
*G06F 13/16* (2006.01)

(52) U.S. Cl.
CPC .......... *G06F 13/18* (2013.01); *G06F 13/1668* (2013.01)

(58) Field of Classification Search
CPC ............................ G06F 13/18; G06F 13/1668
USPC .......................................................... 711/151
See application file for complete search history.

(56) References Cited

U.S. PATENT DOCUMENTS 8,645,592 B2 * 2/2014 Green .................. G06F 9/4881 710/36
2009/0204948 A1 * 8/2009 Krauss ..................... G06F 9/52 717/127
2012/0239848 A1 * 9/2012 Alon ....................... G06F 13/28 710/308
2013/0326528 A1 * 12/2013 Shankar ................ G06F 9/4881 718/103
2019/0228809 A1 * 7/2019 Srinivasan .......... G06F 12/0207
2019/0324646 A1 * 10/2019 Homma ................ G06F 3/0659
2021/0117245 A1 * 4/2021 Sampson .................. G06F 8/61
2021/0263866 A1 * 8/2021 Norman ............. G06F 13/1668
2022/0075638 A1 * 3/2022 Shukla ..................... G06N 3/04
2022/0156575 A1 * 5/2022 Mills ...................... G06N 3/045
2022/0180187 A1 * 6/2022 Kim ....................... G06N 3/063
2022/0318061 A1 * 10/2022 Hebbalalu ............. G06F 9/4831
2023/0297498 A1 * 9/2023 Xiao ...................... G06N 20/00 711/154
2023/0325087 A1 * 10/2023 Petre .................. G06F 13/1673 706/26
2024/0037046 A1 * 2/2024 Mombers ................ G06F 13/28
2024/0134786 A1 * 4/2024 Grymel ............... H03M 7/3066
2024/0296074 A1 * 9/2024 Hebbalalu ............. G06F 9/4831
2025/0086125 A1 * 3/2025 Zaglewski .......... G06F 13/1689

FOREIGN PATENT DOCUMENTS

KR 20230106733 A 7/2023

* cited by examiner

*Primary Examiner* — Christopher B Shin

(57) ABSTRACT

According to one example of the present disclosure, a system may be provided. The system may comprise at least one processing core configured to process computations of the at least one neural network model comprising at least one tensor, at least one memory circuit configured to store the at least one tensor, a bus circuit, electrically coupled to the at least one processing core and the at least one memory circuit, configured to transmit the at least one tensor based on a memory access operation instruction, and a controller configured to control a priority of a memory access operation for each tensor of the at least one processing core.

20 Claims, 14 Drawing Sheets

| Operation | Energy(pj) |
|---|---|
| 8b Add | 0.03 |
| 16b Add | 0.05 |
| 32b Add | 0.1 |
| 16b FP Add | 0.4 |
| 32b FP Add | 0.9 |
| 8b Mult | 0.2 |
| 32b Mult | 3.1 |
| 16b FP Mult | 1.1 |
| 32b FP Mult | 3.7 |
| 32b SRAM Read | 5 |
| 32b DRAM Read | 640 |

DYNAMIC ASSIGNMENT OF BUS BANDWIDTH FOR SENDING TENSORS TO NEURAL PROCESSING UNITS

CROSS-REFERENCE TO RELATED APPLICATIONS

This application claims the priority of Korean Patent Application No. 10-2024-0114593 filed on Aug. 26, 2024, in the Korean Intellectual Property Office, the disclosure of which is incorporated herein by reference.

BACKGROUND OF THE DISCLOSURE

Technical Field

The present disclosure relates to systems and methods for controlling a processing core.

Background Art

Humans have the intelligence to recognize, classify, infer, predict, control/decision making, and the like. Artificial intelligence (AI) is the artificial imitation of human intelligence.

The human brain is made up of tons of nerve cells called neurons. Each neuron is connected to hundreds to thousands of other neurons through connections called synapses. In order to mimic human intelligence, the operation of biological neurons and the connections between neurons are modeled in a neural network (NN) model. In other words, a neural network is a system of nodes connected in a layer structure that mimics neurons.

SUMMARY OF THE DISCLOSURE

Embodiments relate to dynamically prioritizing sending of each tensor over a bus circuit to at least one processing core. The at least one processing core performs computation operations of at least one neural network model associated with tensors. At least one memory circuit stores the tensors. The bus circuit is operably coupled to the at least one processing core and the at least one memory circuit. The bus circuit sends the tensors from the at least one memory circuit to the at least one processing core responsive to receiving requests for memory access operations. A controller is operably coupled to the bus circuit. The controller determines the priority of a memory access operation of each of the tensors and controls the bus circuit to send each of the tensors to the at least one processing core according to the determined priority.

In one or more embodiments, the controller determines the priority of the memory access operation of each of the tensors by comparing lengths of memory cycles using the bus circuit and lengths of computation cycles of the tensors.

In one or more embodiments, the controller controls one or more quality of service parameters associated with the bus circuit according to the determined priority of the memory access operation of each of the tensors.

In one or more embodiments, the controller determines the priority of the memory access operation of each of the tensors by at least comparing a computation cycle of a first tensor of the tensors at a processing core with a memory cycle of a second tensor subsequent tensor of the tensors.

In one or more embodiments, the controller increases bus bandwidth allocated to a first processing core of the at least one processing core by decreasing the bus bandwidth allocated to a second processing core of the at least one processing core responsive to determining that a data starvation period is predicted to occur or has occurred in the first processing core.

In one or more embodiments, the controller increases a priority of sending tensors of a first processing core of the at least one processing core to increase bus bandwidth allocated to the first processing core responsive to determining that a data starvation period is predicted to occur or has occurred in the first processing core.

In one or more embodiments, the controller controls the bus circuit to cede at least a portion of bandwidth of the bus circuit allocated to the at least one processing core responsive to determining that the at least one processing core is in a compute bound status.

In one or more embodiments, the controller determines priority of sending tensors to the at least one processing core via the bus circuit responsive to receiving a data starvation signal.

In one or more embodiments, the system further includes a counter for determining a data starvation status. Whether the at least one processing core is in the data starvation status is determined by comparing a counter value of the counter with a preset counter threshold.

In one or more embodiments, each of the at least one processing core includes a plurality of processing elements (PEs). The plurality of PEs include at least one of a multiply and accumulate (MAC) operator, an adder tree, or an arithmetic logic unit (ALU) operator.

Embodiments also relate to assigning bandwidth for sending tensors. Whether a data starvation has occurred or is predicted to occur in at least one processing core configured to perform computation operations of at least one neural network model associated with tensors is determined. The priority of memory access operations of each of the tensors via a bus circuit is determined responsive to determining whether the data starvation has occurred or is predicted to occur in the at least one processing core. The bandwidth of the bus circuit for sending each of the tensors to the at least one processing core is assigned according to the determined priority. Each of the tensors is sent to the at least one processing core via the bus circuit according to the bandwidth of the bus circuit assigned to send each of the tensors to the at least one processing core.

In one or more embodiments, determining whether the data starvation has occurred or is predicted to occur in at least one processing core includes comparing a computation cycle of a first tensor to be processed by the at least one processing core and a memory cycle for sending a second tensor to the at least one processing core via a bus circuit, the second tensor processed by the at least one processing core subsequent to the first tensor In one or more embodiments, assigning of the bandwidth includes controlling one or more quality of service parameters associated with the bus circuit according to the determined priority of the memory access operation of each of the tensors.

In one or more embodiments, determining whether the data starvation has occurred or is likely to occur includes determining a memory cycle of a first tensor of the tensors, and determining a computation cycle of a second tensor of the tensors subsequent to the first tensor.

In one or more embodiments, the assigning of the bandwidth includes reassigning at least a portion of bus bandwidth allocated to a first processing core of the at least one processing core to a second processing core of the at least one processing core.

In one or more embodiments, determining of the priority includes prioritizing sending of at least one of the tensors based on a data starvation signal indicating that processing elements in the at least one processing core is idle.

In one or more embodiments, a determining of whether the data starvation has occurred or is likely to occur includes comparing a counter value of a counter with a preset counter threshold.

In one or more embodiments, assigning the bandwidth of the bus circuit includes increasing bus bandwidth to send a tensor that is memory bound by the at least one processing core.

In one or more embodiments, the priority of the memory operations of each of the tensors is one of a first priority, a second priority higher in priority than the first priority, or a third priority higher in priority than the second priority.

DETAILED DESCRIPTION OF THE EMBODIMENT

Figure 1A:
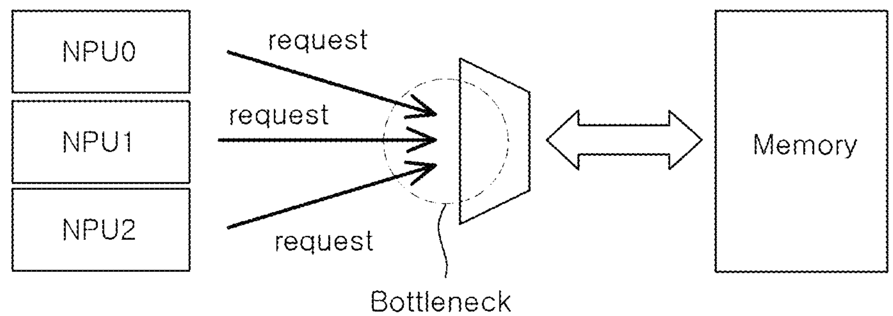
FIG. 1A and FIG. 1B are diagrams illustrating occurring of a bottleneck when performing read operations and write operations by neural processing units in a conventional control system.

Particular structural or step-by-step descriptions for examples according to the concept of the present disclosure disclosed in the present specification or application are merely exemplified for the purpose of explaining the examples according to the concept of the present disclosure.

Examples according to the concept of the present disclosure may be embodied in various forms. Examples according to the concept of the present should not be construed as being limited to the examples described in the present specification or application.

Examples according to the concept of the present disclosure may apply various changes. The present disclosure may take many forms. Accordingly, specific examples are illustrated in the drawings and described in detail in the present disclosure. However, this is not intended to limit the examples according to the concepts of the present disclosure to a specific disclosure form. Therefore, it should be understood that all changes, equivalents or substitutes included in the spirit and scope of the present disclosure are included in the present disclosure.

Terms such as first and/or second may be used to describe various components. However, the present disclosure should not be limited by the above terms. These terms are only used for the purpose of distinguishing one component from another. For example, without departing from the scope of rights according to the concept of the present disclosure, a first element may be termed a second element, and similarly, a second element may also be termed a first element.

When an element is referred to as being "connected to" or "in contact with" another element, it is understood that the other element may be directly connected to or in contact with the other element, but other elements may be disposed therebetween. On the other hand, when it is mentioned that a certain element is "directly connected" or "directly connected" to another element, it should be understood that no other element is present therebetween. Other expressions describing the relationship between elements, such as "between" and "immediately between" or "adjacent to" and "directly adjacent to", etc., should be interpreted similarly.

In the present disclosure, expressions such as "A or B", "at least one of A or/and B" or "one or more of A or/and B" may include all possible combinations thereof. For example, "A or B", "at least one of A and B" or "at least one of A or B" may refer to both (1) including at least one A, (2) including at least one B, or (3) including both at least one A and at least one B.

As used herein, expressions such as "first", "second", "first or second" may modify various elements, regardless of order and/or importance. Said expressions are used only to distinguish one element from other elements, and does not limit the elements. For example, the first user apparatus And the second user device may represent different user device regardless of order or importance. For example, without departing from the scope of rights described in this disclosure, the first element may be named as the second element, and similarly, the second element may also be renamed as the first element.

Terms used in present disclosure are only used to describe specific examples, and may not be intended to limit the scope of other examples. The singular expression may include the plural expression unless the context clearly dictates otherwise. Terms used herein, including technical or scientific terms, may have the same meanings as commonly understood by one of ordinary skill in the art described in this document.

Among terms used in present disclosure, terms defined in a general dictionary may be interpreted as having the same or similar meaning as the meaning in the context of the related art. Unless explicitly defined in this document, it should not be construed in an ideal or overly formal sense. In some cases, even terms defined in the present disclosure cannot be construed to exclude examples of the present disclosure.

The terms used herein are used only to describe specific examples, and are not intended to limit the present disclosure. Singular expressions include plural expressions unless the context clearly dictates otherwise. In this specification, terms such as "comprise" or "having" are intended to indicate that the described feature, number, step, operation, component, part, or combination thereof is present. Accordingly, it should be understood that the presence or addition of one or more other features, numbers, steps, operations, components, parts, or combinations thereof is not precluded.

Unless defined otherwise, all terms used herein, including technical or scientific terms, have the same meaning as commonly understood by one of ordinary skill in the art to which this disclosure belongs. Terms such as those defined in commonly used dictionaries should be interpreted as having a meaning consistent with the meaning in the context of the related art. Unless explicitly defined in this disclosure, it is not to be construed in an ideal or overly formal sense.

Each feature of the various examples of the present disclosure may be partially or wholly combined or combined with each other. Various examples of the present disclosure are technically capable of various interlocking and driving as can be fully understood by those skilled in the art. Each of the examples of the present disclosure may be implemented independently of each other or may be implemented together in an association relationship.

In describing the examples, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Definitions of Terms

To facilitate understanding of the present disclosure, the following is a brief summary of terms used herein.

NPU: Abbreviation for neural processing unit, which may refer to a processor specialized for computing a neural network model independent of a central processing unit (CPU).

SoC: Abbreviation for system-on-chip, which can refer to a semiconductor chip that integrates at least one processor and various circuit elements of an electronic system into a single integrated circuit (IC). An SoC can integrate digital circuits, analog circuits, mixed-signal and radio frequency processing circuits on a single semiconductor chip. An SoC may include at least one processor. For example, the at least one processor that may be included in the SoC may be at least one of a central processing unit (CPU), a digital signal processor (DSP), an image signal processor (ISP), a graphics processing unit (GPU), and a neural processing unit (NPU). The SoC may include at least one memory. For example, the memory that may be included in the SoC may be at least one of random-access memory (RAM), read-only memory (ROM), and cache memory. The SoC may include a high-speed data bus, such as AXI, AHB, APB, or the like, for efficient communication between multiple IP blocks included in the SoC. The SoC may include at least one interface, such as PCIe, USB, I2C, SPI, UART, GPIO, for connectivity with external devices and sensors. The SoC may include an on-chip power management unit that regulates voltage and power distribution across the semiconductor chip. The SoC may include communication interfaces that integrate wired and wireless communication protocols such as Ethernet, Wi-Fi, Bluetooth, and cellular connectivity for data transfer. SoCs can be manufactured in a variety of packaging technologies.

NN: Abbreviation for neural network, a network of nodes connected in a layer structure, mimicking the way neurons in the human brain are connected through synapses, to mimic human intelligence.

Information of a neural network model: information about the structure of the network, information about the number of layers, information about the connection relationship of each layer, information about the parameters of each layer, information about the computational processing method, information about the activation function, the data type of the parameters of each layer (e.g., floating-point or integer), and the bitwidth of each parameter. The parameters of each layer may be represented by a tensor of a certain size. In a compilation step, the at least one layer may be partitioned into tiled tensors according to the calculation circuit architecture and internal memory size. Based on the parameter size of each tensor (such as the size of the input parameters and the size of the weight parameters) and the required computation algorithm (such as matrix multiplication, activation function, and softmax function), the clock cycles of the calculation circuit for processing the tensor and the data transfer clock cycles for sending to the memory may be calculated.

DNN: Abbreviation for deep neural network, which can refer to an increase in the number of hidden layers of a neural network to achieve higher artificial intelligence.

CNN: Abbreviation for convolutional neural network, a neural network that functions similarly to the visual cortex of the human brain in processing images. Convolutional neural networks are known to be well-suited for image processing and are known for their ability to extract features from input data and identify patterns in the features.

Transformer: The transformer neural network is a DNN based on attention techniques. It utilizes many matrix multiplication operations. A transformer can take an input value and parameters such as query (Q), key (K), and value (V) to obtain an output value, an attentions (Q,K,V). Based on the output value (i.e., the attentions (Q,K,V)), the transformer can process various inference operations. Transformers are actively utilized in language generation models.

Kernel: Refers to the weights of the N×M matrix of convolutions. Each layer of the neural network model has a plurality of kernels, and the number of kernels may be referred to as the number of channels, the number of filters, and the like.

Tensor: A tensor is a multidimensional matrix parameter processed by a neural network model. A tensor can refer to various parameters of a neural network model, such as weights, feature maps, kernels, and attention parameters. A tensor may refer to an input parameter input to a neural processing unit and an output parameter computed by a neural processing unit. A tensor may be a parameter of one tile that is computed by the neural processing unit at a time. The neural network model may comprise a plurality of layers, and each layer may be configured to include at least one tensor. For example, an input parameter of a first layer of the neural network model may be referred to as a first tensor, a weight parameter of the first layer may be referred to as a second tensor, and an output parameter of the first layer may be referred to as a third tensor. For example, the input parameters of the first layer of the first neural network model may be referred to as the first tensor, and the input parameters of the first layer of the second neural network model may be referred to as the second tensor.

Neural Network (NN) models are categorized according to the number of layers into 'single-layer neural networks' and 'multi-layer neural networks.' A typical multi-layer neural network includes an input layer, a hidden layer, and an output layer. (1) The input layer is the layer that receives external data, and the number of neurons in the input layer is the same as the number of input variables. (2) The hidden layer is located between the input and output layers and receives signals from the input layer, extracts features, and passes them to the output layer. (3) The output layer receives signals from the hidden layer and outputs them. The input signals between neurons are multiplied by their respective weights, which have a value between 0 and 1, and then summed up. If this sum is greater than the threshold of the neuron, the neuron is activated and implemented as an output value through the activation function.

On the other hand, a neural network with an increased number of hidden layers to achieve higher artificial intelligence is called a deep neural network (DNN). There are many types of DNNs, but convolutional neural networks (CNNs) are known for their ability to extract features from input data and identify patterns in the features.

Convolutional neural networks are neural networks that function similarly to the visual cortex of the human brain, which processes images. Convolutional neural networks are known to be suitable for image classification, object detection and the like.

Convolutional neural networks are composed of iterations of convolutional and pooling channels. The convolutional operation takes up most of the computational time in a convolutional neural network. Convolutional neural networks recognize objects by extracting the features of the image in each channel by a kernel in the form of a matrix, and providing homeostasis such as translation or distortion by pooling. In each channel, a feature map is obtained by convolving the input data and the kernel, and an activation function such as ReLU (Rectified Linear Unit) is applied to generate an activation map for that channel. Pooling can then be applied. The neural network that actually classifies the patterns is located at the end of the feature extraction neural network and is called the fully-connected layer. In the computational processing of a convolutional neural network, most of the operations are performed through convolution or matrix multiplication. The necessary kernels are read from memory quite frequently. A significant part of the operation of a convolutional neural network is the time to read the kernels corresponding to each channel from memory. However, the examples of the present disclosure are not limited to convolutional neural networks and can be applied to transformer neural networks, etc.

Memory (also referred to herein as "a memory circuit") may be divided into memory sections (e.g., main memory or off-chip memory), internal memory, on-chip memory, and the like. Each memory may comprise a plurality of memory cells, each memory cell having a unique memory address. In particular, whenever the neural processing unit recalls a weight parameter stored in the memory or recalls other parameters, a latency of several clocks may occur before accessing the memory cell corresponding to the address of the memory.

The neural processing unit may perform memory access operations of writing data to or reading data from the memory, and computation operations of computing a neural network model based on the data.

More recently, systems have been developed in which a plurality of neural processing units, or a plurality of processing cores contained in a neural processing unit, and are configured to simultaneously send data to a memory or receive data from the memory.

In such systems, there may be cases where a plurality of neural processing units or a plurality of processing cores simultaneously attempt to access memory over a bus. In this case, the bus handling data communication may be prioritize memory access commands that arrive first. Thus, contention for memory access on the bus may occur. Further, until the memory access operation that is processed first is completed, the next memory access operation may be delayed, which may result in a data starvation period.

Such a contention may result in further increasing the processing time and power to read the required parameters from the memory and perform the AI operation in the neural processing unit. Furthermore, if the memory access operation is not completed, a data starvation period occurs in which the neural processing unit is unable to perform the computation operation because the required data is not supplied.

On the other hand, the processing time of the memory access operations for performing the computation of the neural processing unit is related to the size of the data. That is, the larger the size of the data, the greater the amount of data transferred, which may increase the data transfer time. The time for the neural processing unit to process AI operations utilizing the data provided by the memory access operation is related to the complexity of the computation algorithm. That is, as the AI computation algorithm becomes more complex, the amount of computation increases, which may increase the data computation time. Therefore, the processing time of memory access operations and the processing time of AI algorithm operations may not be the same. For example, the time to complete a memory access operation in a particular interval may be shorter or longer than the time required to complete a computation operation.

When the completion time of a memory access operation is longer than the completion time of a computation operation, it may be referred to as a memory bound status. A memory bound status may occur when the computational operation is limited by the memory access speed rather than the computational power of the neural processing unit. In such a status, a data starvation period may occur during which the neural processing unit is not active as the neural processing unit waits for data to be fetched from or written to memory.

In contrast, when the completion time of a computation operation is longer than the completion time of a memory access operation, it may be referred to as a compute bound status. A compute bound status may occur when the processing power of the neural processing unit is the limiting factor, e.g., when AI computation time take longer than memory access time. In such a status, the neural processing unit may experience data starvation periods due to inefficiencies in scheduling AI computations or allocating memory bandwidth. Accordingly, a data starvation period occurs in which computational operations of a neural processing unit cannot be performed in a memory-bound status or a compute-bound status.

According to an aspect of the present disclosure, a quality of service (QOS) priority for read operations and write operations for accessing memory to each of the neural processing units or each of the processing cores is varied to improve the efficiency of the read operations and write operations of direct memory access (DMA). Furthermore, a QoS priority for read operations and write operations for accessing memory of each neural processing unit or each processing core may be set based on an analysis of a memory bound status and a compute bound status to improve an efficiency of the read operations and write operations of a direct memory access (DMA). Bus bandwidth assigned to the neural processing units or the processing cores may be reassigned on a tensor-basis when a data starvation period is predicted to occur because the time required to complete a memory access operation for a tensor is shorter or longer than the time required to complete a computation operation for another tensor, thereby enabling the calculation circuit to operate without a data starvation period and improve data processing performance and reduce power consumption.

Figure 1B:
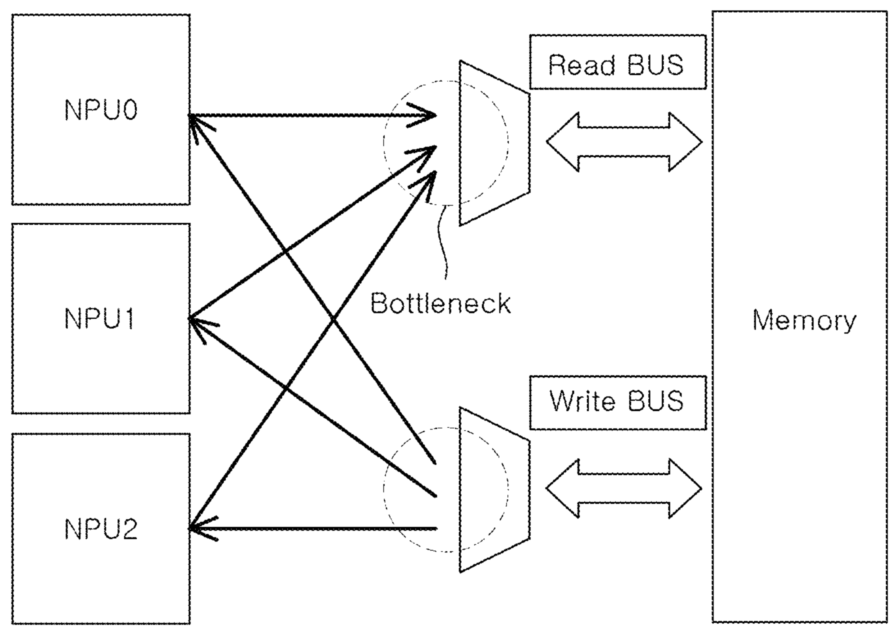

Hereinafter, one example of the present disclosure will be described with reference to the accompanying drawings. FIG. 1A and FIG. 1B are diagrams illustrating occurring of a bottleneck when performing read operations and write operations of each of a plurality of neural processing units in a conventional control system.

A conventional control system controls operations of neural processing units to access data from a memory (i.e., memory access operations) and/or operations of the neural processing units to compute data provided to them (i.e., computation operations).

First, FIG. 1A illustrates a case where the memory is connected to a bus, and the bus is implemented as a single bus architecture. In this case, the memory cannot process read operations and write operations simultaneously, but can only perform read operations or write operations to one of neural processing units.

On the other hand, FIG. 1B illustrates a case where the memory is connected to a bus, and the bus is implemented as a dual-independent bus. In this case, although the memory can process read operations and write operations through the bus respectively, a bottleneck occurs because the read operations and write operations for the plurality of neural processing units should be processed sequentially.

In addition, if a difference occurs between the request time of the read operation and the write operation, the corresponding neural processing unit is bound to have a data starvation period. That is, according to FIG. 1A and FIG. 1B, when a plurality of neural processing units or a plurality of processing cores simultaneously attempt to access the memory, a conventional control system processes the access attempt on a first come, first served basis. Accordingly, the plurality of neural processing units compete to access the memory. This competition results in an increase in the time it takes for each neural processing unit to complete the memory access operation. Further, a data starvation period occurs in the neural processing unit that prevents it from initiating a computation operation because the memory access operation has not been completed timely.

Even though it is not a race among a plurality of neural processing units or a plurality of processing cores, the time consumed to complete a memory access operation and the time consumed to complete a computation operation are not always equal at any given point in time. Therefore, in some intervals, the memory access operation time may be longer than the computation operation time (i.e., a memory bound status), which also causes a data starvation period during which the calculation circuit does not operate.

In cases such as FIG. 1B, the bus without specific scheduling criteria generates an order queue of the bus on a first come, first served basis, in which read and write operations for each tensor requested by the corresponding neural processing unit requested first is prioritized. Accordingly, data starvation periods often occur in the plurality of neural processing units. In other words, according to the order-queue of the bus for the operation of the neural network model according to the conventional control system, bottlenecking of the bus may occur frequently due to inefficient data starvation periods and the resulting degradation of the effective bus bandwidth.

To resolve this issue, a system according to one example of the present disclosure may reduce a data starvation period of a neural processing unit by determining the priorities of tensors for processing by a particular neural processing unit and sent over a bus associated with the plurality of neural processing units based on 1) a memory access operation time of the bus and 2) a computation operation time at the neural processing unit for each of the tensors. In other words, a system according to one example of the present disclosure may determine the priorities of competing tensors when the transmission times of the plurality of tensors corresponding to the plurality of neural processing units requested to use the bus overlap, thereby reducing the data starvation time of the calculation circuits of a particular neural processing unit in the system. In this way, data starvation of the neural processing unit caused by memory bandwidth limitations and memory latency during read and write operations may be mitigated or eliminated.

In the following, a neural processing unit according to examples of the present disclosure may also be referred to as a processing core. For example, one neural processing unit may refer to a semiconductor chip formed on a substrate comprising at least one processing core. In other words, a plurality of processing cores may be configured as part of one neural processing unit. As described herein, one processing core may refer to a calculation circuit configured to process operations of a neural network model. In various examples of the present disclosure, the neural processing unit and the processing cores may be substantially equivalent to each other.

In some examples, the first controller 1100 and the second controller 100 may be integrated so as to form a controller. A controller may be referred to as a control circuit.

Figure 2:
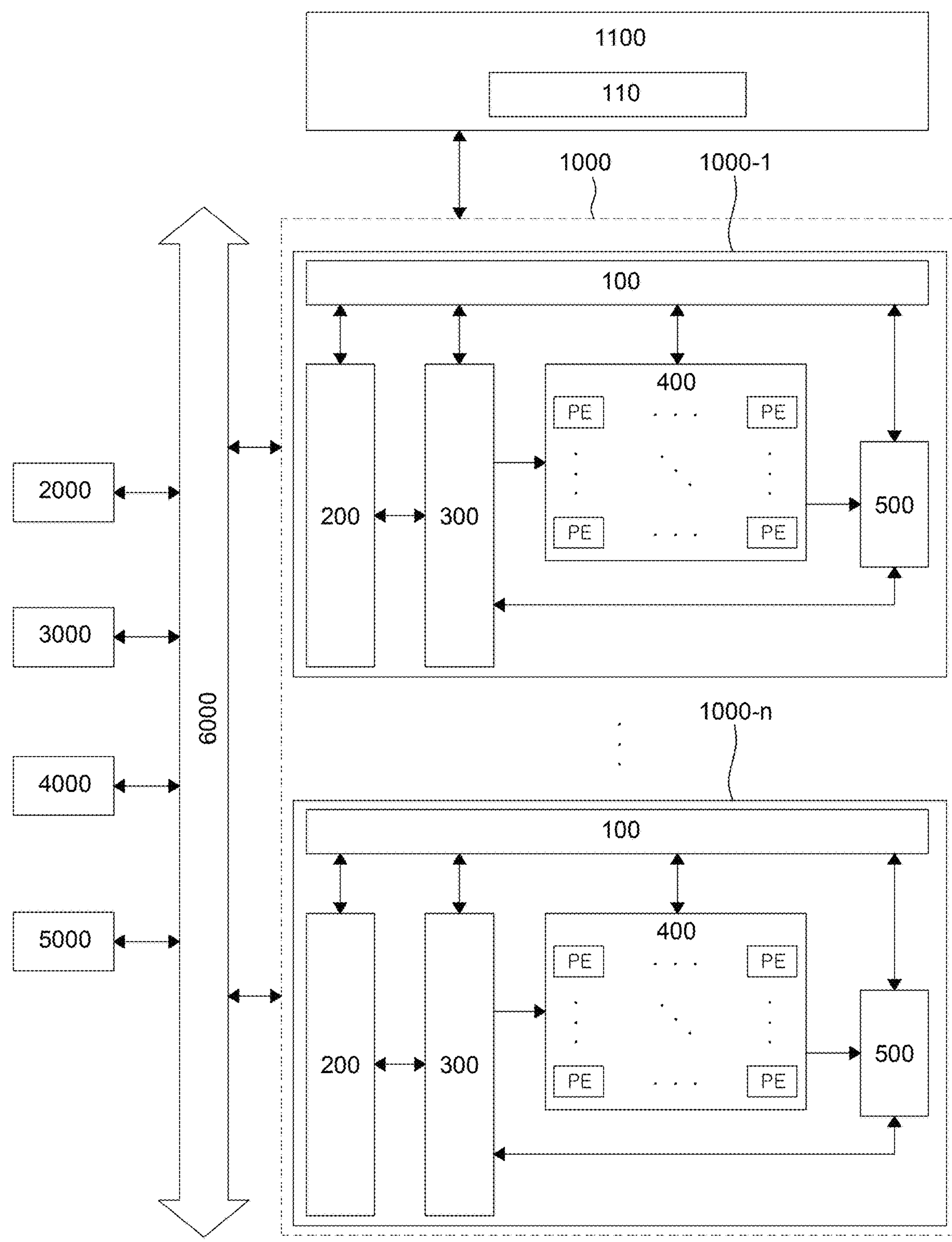
FIG. 2 is a schematic diagram illustrating a system for controlling a processing core, according to one example of the present disclosure.

FIG. 2 is a schematic diagram illustrating a system for controlling a processing core according to one example of the present disclosure. FIG. 2 illustrates a neural processing unit including a plurality of processing cores, as well as a plurality of peripheral devices for computing the neural processing unit. Accordingly, the neural processing unit and the plurality of peripherals may be referred to as a system. At least some of the element(s) of the system may comprise a system-on-chip (SoC).

Referring to FIG. 2, the neural processing unit (NPU) 1000 of the system 10000 may include a plurality of processing cores 1000-1, . . . , **1000-*n* and may be configured to communicate with a central processing unit (CPU) 2000, a memory 3000, an image sensor 4000, and/or a decoder 5000 to perform various neural network inference functions. In addition, each of the processing cores of the neural processing unit 1000 may be configured to be controlled via a respective first controller 1100**.

Each of the neural processing unit 1000, the central processing unit 2000, the memory 3000, the image sensor 4000, the decoder 5000, and/or the bus 6000 according to one example of the present disclosure may be formed as independent semiconductor circuits, or at least a portion of them may be integrated within one packaging, and the present disclosure is not limited thereto.

According to various examples, the neural processing unit 1000 of the system 10000 may be patterned on the same semiconductor die as the central processing unit 2000.

According to various examples, the neural processing unit 1000, the central processing unit 2000, and the memory 3000 of the system 10000 may be patterned on the same semiconductor die.

According to various examples, the neural processing unit 1000 of the system 10000 may comprise semiconductor dies connected to the central processing unit 2000 by chiplet technology. When chiplet technology is applied, an interposer may further be included.

According to various examples, the system 10000 including the neural processing unit 1000, the central processing unit 2000, and the memory 3000 may be configured of semiconductor dies connected by chiplet technology.

Each of the elements described above is characterized by its operation function, and each of the elements may be embodied in a circuit board, a silicon substrate, a resistor element, a transistor, and the like. Thus, each of the elements may be a semiconductor circuit with numerous transistors connected thereto, some of which may be difficult to identify and distinguish with the naked eye, and may be identified only by their operation. Accordingly, each of the elements of FIG. 2 may be referred to as a corresponding circuit unit.

Each of the central processing unit 2000, memory 3000, image sensor 4000, and decoder 5000 may communicate via a bus 6000 to send and receive data to and from each of the processing cores 1000-1, . . . , **1000-*n*. According to one example of the present disclosure, the bus 6000 may be an Advanced extensible Interface (AXI) bus. However, without limitation, each of the processing cores 1000-1, . . . , 1000-*n*** may be configured to be directly coupled to at least one of the elements described above.

The neural processing unit 1000 may be defined as a processor specialized for the operation of a neural network model. In particular, the neural processing unit 1000 may be specialized for matrix multiplication or convolutional operations, which account for the majority of the computation in the neural network model.

Neural network models are based on neural networks, which are networks of artificial neurons that receive multiple inputs or stimuli, multiply them by their respective weights, add them together, and then transform and transmit the resulting deviations through an activation function. The neural network model trained in this way can be used to output inference results from input data. Inference results can be object detection, image classification, event detection, pose estimation, token generation, natural language generation, image generation, and the like.

The neural processing unit 1000 may be a semiconductor implemented as an electrical/electronic circuit. By electrical/electronic circuitry, it may be meant to include a number of electronic elements (e.g., transistors, capacitors).

In the case of a neural network model based on a transformer and/or CNN, the neural processing unit 1000 may selectively process matrix multiplication operations, convolutional operations, and the like according to the architecture of the neural network.

For example, in each layer of a convolutional neural network (CNN), the input feature map corresponding to the input data and the kernel corresponding to the weights may be matrices comprising a plurality of channels. A convolutional operation on the input feature map and the kernel may be performed, and a convolutional operation on each channel and a pooled output feature map may be generated. An activation function may be applied to the output feature map to generate an activation map of the corresponding channel. Pooling may then be applied to the activation maps. The activation maps may be collectively referred to herein as the output feature maps and each of the feature maps and weights may be referred to as a tensor.

However, the examples of the present disclosure are not limited thereto, and the output feature map may be subjected to matrix multiplication operations, convolutional operations, or the like.

Furthermore, an output feature map according to the examples of the present disclosure is to be interpreted in a comprehensive sense. For example, the output feature map may be the result of a matrix multiplication operation or a convolution operation. Accordingly, the plurality of processing elements (PEs) included in the processing elements array 400 may be modified to further include processing circuit units for additional algorithms.

The neural processing unit 1000 may be configured to include a plurality of processing elements (PEs) for processing convolutional and matrix multiplication required for the neural network operations.

The neural processing unit 1000 may be configured to include respective calculation circuits optimized for matrix multiplication operations, convolutional operations, activation function operations, pooling operations, stride operations, batch-normalization operations, skip-connection operations, splicing operations, quantization operations, clipping operations, padding operations, and attention operations required for the neural network operations.

For example, the neural processing unit 1000 may be configured to include a special function unit (SFU) 500 for processing at least one of the above-described algorithms: an activation function operation, a pooling operation, a stride operation, a batch-normalization operation, a skip-connection operation, a splicing operation, a quantization operation, a clipping operation, and a padding operation.

The plurality of tensors sent to the neural processing unit 1000 via the bus 6000 may be configured to be controlled by the first controller 1100. Specifically, the first controller 1100 may be configured to, prior to each of the processing cores 1000-1, . . . , **1000-*n* directly accessing the memory 3000 to read and/or write to the memory 3000 or the like, determine which tensors cause a data starvation period based on the memory access operation for each tensor and the cycle time for the computation operation (i.e., the number of clock cycles taken to process the tensor), and determine a prioritization between the identified tensor and the subsequent tensor. The bus 6000 may be configured to process each tensor sequentially based on a determined priority. Accordingly, The first controller 1100 may be configured to ensure that higher priority tensors are ceded the bus 6000 bandwidth of lower priority tensors, so that data starvation periods do not occur. Each tensor has a respective data size, and the first controller 1100 may calculate a number of clock cycles based on the size of each tensor sent on the bus 6000. Further, the compiler may pre-calculate the number of clock cycles in which the corresponding tensor is processed on the processing core when compiling the corresponding neural network model. Thus, the first controller 1100** may obtain cycle information of each tensor calculated at compilation time. As will be described further, the clock cycles of the memory access operation for each tensor may be referred to as memory cycles, and the clock cycles of the computation operation may be referred to as computation cycles. Further, it is unlikely that the number of pre-calculated computation clock cycles will change when they are processed by the neural processing unit. This is the case when the neural processing unit is a dedicated AI accelerator configured to process neural network models. In contrast, the number of pre-calculated memory cycles may be a minimum number and may have dynamic characteristics that may increase above the minimum number for various reasons, such as bandwidth contention on the bus, low priority in the order-queue, and the like. Thus, the pre-acquired memory cycles may refer to a minimum number of memory cycles.

Specifically, the neural processing unit 1000 may include a controller 100, a direct memory access (DMA) 200, an internal memory 300, a processing elements array 400, and a special function unit 500. However, in describing the neural processing unit 1000, the following description will be limited to one processing core 1000-1. However, this is merely for convenience of description and may be applied substantially equally to any of the processing cores included in the neural processing unit 1000.

The elements of the processing core 1000-1 are distinguished by their operation functions, and each element may be formed utilizing at least one of a substrate, a resistive element, and a transistor. Thus, each element may be a semiconductor circuit with numerous transistors connected thereto, some of which may be difficult to identify and distinguish with the naked eye, and may be identified only by their operation. Accordingly, each functional unit of the processing core 1000-1 may be referred to as a circuit unit.

The second controller 100 may be configured to control operations associated with computing the neural network model by each of the DMA 200, the internal memory 300, the processing element array 400, and the special function unit 500. The second controller 100 may be directly coupled or indirectly coupled to each of the DMA 200, the internal memory 300, the processing element array 400, and the special function unit 500 to communicate with each other. For example, the second controller 100 may adjust the caching size of each tensor stored in the internal memory 300 for each computation step based on the capacity of the internal memory 300. The second controller 100 may be configured to control the processing core 1000-1 based on machine code (e.g., binary code) of the compiled neural network model.

For example, the compiler may generate machine code that determines a read/write sequence for neural network model data, as well as information on the processing sequence of neural network layers, the operation sequence for convolutional multiplication, the operation sequence for matrix multiplication, and the read/write operation sequence for DMA data. These sequences are determined based on the hardware characteristics of the processing core 1000-1, such as the number of processing elements, memory capacity, functional circuit units within the special function unit, and the presence of a post-processing unit. Accordingly, the second controller 100 may control the processing core 1000-1 based on machine code. The machine code may be referred to as binary code, executable code, or the like.

The second controller 100 may obtain schedule information that schedules a sequence of operations of the neural network model to be performed by the processing core 1000-1 based on the directed acyclic graph (DAG) of the neural network model compiled by the compiler. One computation step may be processed in one tensor unit. Here, the compiler may determine an operation scheduled that can accelerate the operation of the neural network model by determining the number of processing elements (PEs) of the processing core 1000-1, the size of the internal memory 300, the size of the parameters of each layer of the neural network model, and the like. According to the computation schedule, the second controller 100 may be configured to control the required number of processing elements PEs for each computation step and to control the read and write operations of the parameters required in the internal memory 300 for each computation step. The compiler may efficiently schedule the computation steps according to how well it understands the hardware architecture and capability of the processing cores 1000-1. The compiler may determine the order of data required for computation of the neural network model based on the sequence of operations of the layers, convolutions, and/or matrix multiplications of the neural network, and may generate the compiled machine code. The parameters input to the neural processing unit in one computational step may be referred to as an input tensor, and the parameters output from the neural processing unit in the one computational step may be referred to as an output tensor.

In some examples, the processing core 1000-1 may be configured to include an embedded compiler. According to the configurations described above, the processing core 1000-1 may be configured to generate machine code upon receiving one or more input of files in the form of frameworks of various AI software. For example, frameworks of AI software may include TensorFlow, PyTorch, Keras, XGBoost, mxnet, DARKNET, ONNX, and the like. However, the examples of the present disclosure are not limited to a particular AI software framework.

The DMA 200 may be configured to access the memory 3000 via the bus 6000 and request reads and/or writes to the memory 3000. The processing core 1000-1 may receive various data associated with the neural network model from the memory 3000 via the DMA 200. The memory 3000 may be included in a system-on-chip (SoC) or may be configured as a separate memory device.

The internal memory 300 may be a memory disposed in an on-chip area of the processing core 1000-1, and may be a memory for caching or storing data processed in the on-chip area. That is, the internal memory 300 may also be referred to as cache memory.

Further, the internal memory 300 may read and store at least some of the data required for computing the neural network model from the memory 3000. The at least some of the data may be referred to as tensors. The internal memory 300 may be configured to store all or part of the neural network model according to a memory capacity setting for each parameter and the data size for each layer of the neural network model. Parameters of representative data processed for operation of the neural network model may include at least one of an attention parameter, a KV cache parameter, an activation map parameter, an input feature map parameter, an output feature map parameter, a weight parameter, and the like.

Specifically, the internal memory 300 may read and store parameters corresponding to input data from the memory 3000. Additionally, the internal memory 300 may read and store parameters corresponding to output data from the processing element array 400. As described further below, the parameters included in the neural network model may include input values and weights. The input values or output values read or written by the internal memory 300 may include at least one of activation parameters, feature map parameters, KV cache parameters, attention parameters, and the like.

The internal memory 300 may comprise at least one of memories such as a register file, ROM, SRAM, DRAM, Resistive RAM, Magneto-resistive RAM, Phase-change RAM, Ferroelectric RAM, Flash Memory, HBM, and the like. According to one example of the present disclosure, the internal memory 300 may be SRAM, and being configured as SRAM is advantageous in terms of computational processing speed. Further, the internal memory 300 may be organized into at least one memory unit (e.g., a bank and the like.). The internal memory 300 may comprise homogeneous memory or heterogeneous memory.

Further, the data (e.g., the parameters of the neural network model) stored in the memory units of the internal memory 300 may not be fixed as one of the attention, the KV cache, the activation map, the input feature map, the weights, and the output feature map, but may be changed to another one of the attention, the KV cache, the activation map, the input feature map, the weights, and the output feature map as needed. In other words, by varying the memory allocation of the internal memory 300, the utilization efficiency of the internal memory 300 may be improved, i.e., the size of each tensor stored by the internal memory 300 may vary for each computational step.

The processing element array 400 may be configured to include a plurality of processing elements performing multiplication and accumulation (MAC) operations.

Each element of the processing element arrays 400 may be configured to perform operations by receiving an input, such as an input feature map corresponding to input data and/or a kernel corresponding to weights for the neural network.

A processing element may be configured to perform addition, multiplication, accumulation, and the like functions required for processing the neural network model. To this end, each processing element may include at least one of a MAC (multiply-and-accumulate) operator, an adder tree, and an ALU (arithmetic logic unit) operator.

For example, the processing element may receive an input feature map and weights, perform a convolutional computation, and output an output feature map. Additionally, the processing element array 400 or processing element may be referred to as an artificial intelligence (AI) computing unit.

In another example, the processing element (PE) may perform a general matrix multiply (GEMM) operation or a matrix-multiply operation with the input feature map and the weights as inputs to output an output feature map. More specifically, the processing element (PE) may multiply the input feature map in the form of a matrix with a weight matrix, and then add a bias to the matrix to output an output feature map in the form of a matrix. In particular, in the neural processing unit, the matrix multiplication may be performed at a high speed by parallel processing, thereby enabling efficient processing of the matrix multiplication operation.

As another example, the processing element PE may comprise circuitry designed to receive only integer type parameters as input. In such a case, the input parameters of the processing element PE may be converted to integers of a specific bitwidth and stored in the internal memory 300. According to the above-described configuration, the power consumption can be effectively reduced compared to a processor supporting floating-point parameters, and can be efficiently implemented on-device.

The special function unit 500 may process a number of activation functions for imparting nonlinearity to the output feature map.

The activation function processed by the special function unit 500 may include, but is not limited to, a SiLU function, a Softmax function, a sigmoid function, a hyperbolic tangent (tanh) function, a ReLU function, a Leaky-ReLU function, a Maxout function, or an ELU function that yields a non-linear output value with respect to an input value.

On the other hand, it may be technically difficult to support all activation functions in the processing core 1000-1. Therefore, the processing core 1000-1 may approximate various activation functions through a piecewise-linear function approximation algorithm and piecewise-linear function processing circuitry. These activation functions can be optionally applied after the MAC operation. The operational value to which the activation function is applied may be referred to as the activation map.

Further, the special function unit 500 may be configured to include a floating-point multiplier circuit to perform decimal point operations.

As another example, the special function unit 500 may be configured to communicate with the processing element PE and may comprise circuitry designed to receive integer-type parameters output from the processing element PE. In such a case, the special function unit 500 may be further configured to include a dequantization circuit configured to convert the integer-type parameter to a floating-point-type parameter. Further, the special function unit 500 may be configured to process an activation function operation with the floating-point type parameters. Further, the special function unit 500 may be configured to further include a quantization circuit configured to convert a parameter of a floating-point type at the end of the activation function operation to a parameter of an integer type. According to the configuration described above, the special function unit 500 may be configured to process a floating-point operation by de-quantizing an integer parameter when a floating-point operation is required, and to re-quantize the result. In other words, a neural processing unit according to one example of the present disclosure may include a processing element circuit unit configured to process an integer-type parameter and a special function circuit unit pipelined thereto, and the special function circuit unit may include a quantization circuit and an inverse quantization circuit and may be configured to process an activation function operation with a floating-point-type parameter. According to the above-described configuration, the special function unit 500 effectively communicates with the processing element PE that supports only integer parameters, and has the effect of being able to directly convert the types of the parameters and process them even if there is no circuitry disposed outside the neural processing unit. That is, the neural processing unit 1000 is configured to store the integer-formatted tensor in the internal memory 300 by receiving the integer-formatted tensor via the bus 6000 according to a request from the DMA 200. The processing element PE may be configured to compute the integer formatted tensor. The special function unit 500 may be configured to receive the integer-formatted tensor computed by the processing element PE as input, convert it to a floating-point tensor, process the result of the at least one special function, convert it back to an integer-formatted tensor, and store it in the internal memory 300. The neural processing unit 1000 may send the results stored in the internal memory 300 to the memory 3000 via the bus 6000 according to a request from the DMA 200.

Figure 3:
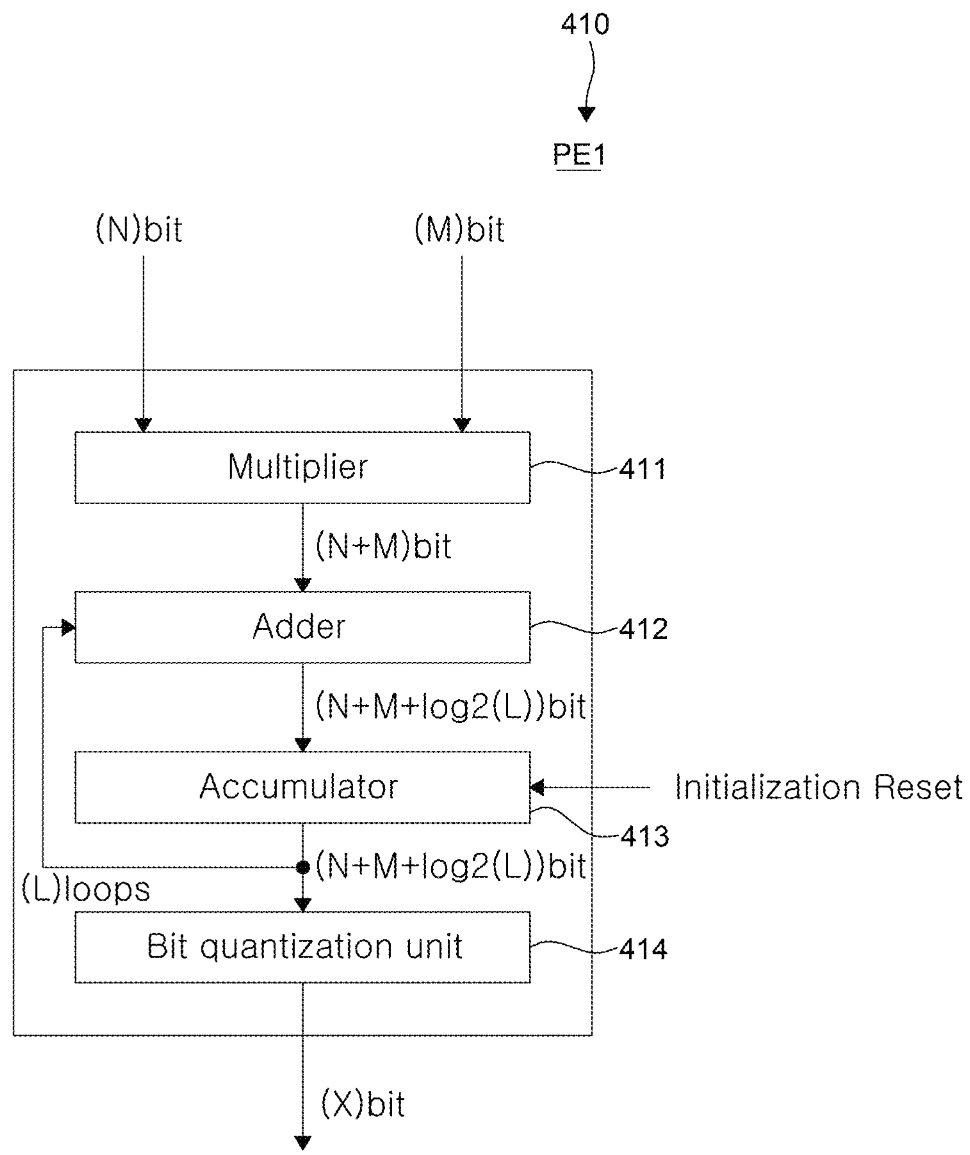
FIG. 3 is a schematic diagram illustrating a processing element, according to one example of the present disclosure.

Referring now to FIG. 3, the following describes a detailed configuration of the processing element. FIG. 3 is a schematic diagram illustrating a processing element according to an example of the present disclosure. Processing element PE 410 may be configured to include a multiplier 411, an adder 412, an accumulator 413, and a bit quantization unit 414. However, the examples according to the present disclosure are not limited to such architecture, and the array of processing elements may be modified to account for the computational characteristics of a target neural network model.

Figure 5:
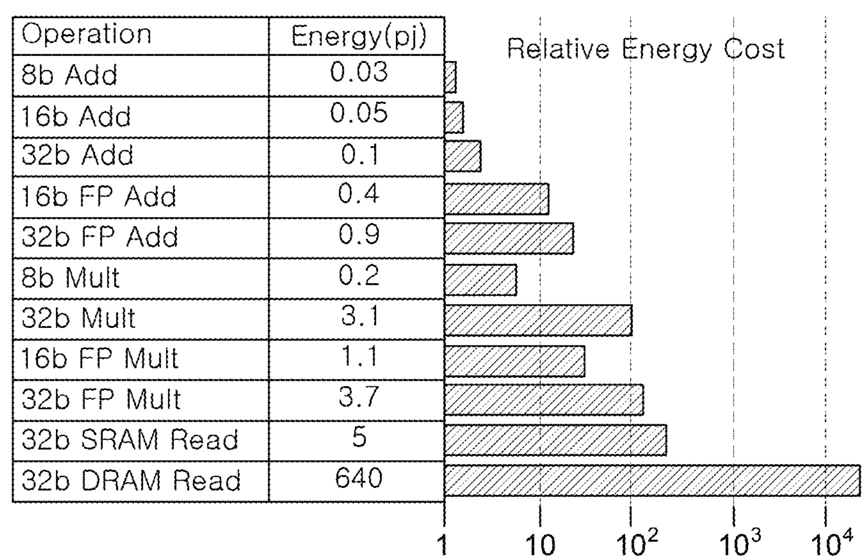
FIG. 5 is a table illustrating energy consumption per unit operation of a neural processing unit, according to one example of the present disclosure.

The multiplier 411 multiplies the input (N)-bit data with the (M)-bit data. The result of the multiplier 411 operation is output as (N+M)-bit data, where N and M are integers greater than zero. The first input may be configured to receive the (N)-bit data and the second input may be configured to receive (M)-bit data, wherein the first input may be configured to receive an activation value and the second input may be configured to receive a weight value. The second controller 100 may control the internal memory 300 to reuse parameters stored in the internal memory 300 according to machine code. Reusing the parameters may mean that the parameters stored in the internal memory 300 are not deleted or otherwise copied or moved to the memory 3000, but are reused in the subsequent operation. According to the above-described configuration, it has the effect of reducing power consumption according to the operation of the memory 3000, as illustrated in FIG. 5. In FIG. 5, 32*b* SRAM Read means the energy required to read one bit of data from the internal memory 300, and 32*b* DRAM Read means the energy required to read one bit of data from the memory 3000 via the bus 6000. It also has the effect of eliminating the latency that occurs when the neural processing unit 1000 sends data to and from the memory 3000 via the bus 6000.

That is, the second controller 100 may acquire reusable variable parameters and reusable constant parameters based on the machine code of the compiled neural network model. Accordingly, the second controller 100 may be configured to control the internal memory 300 to reuse the parameters stored in the internal memory 300.

The processing element may constrain the operation of the multiplier 411 such that when a zero is input at an input of one of the first input and the second input of the multiplier 411, the multiplier 411 may not perform an operation because the result of the operation will be zero even if the operation is not performed if zero is multiplied by any number.

For example, when a zero is input to an input of one of the first input and the second input of the multiplier 411, the multiplier 411 may be configured to operate in a zero-skipping manner. For zero skipping, each of the processing elements PEs included in the processing element array 400 may be enabled or disabled, respectively. The second controller 100 may be configured to provide an enable or disable signal to each of the processing elements PEs on a clock-by-clock basis to each of the processing elements PEs. When the processing element PE is deactivated, the multiplier 411 may be configured to be deactivated. Accordingly, the power consumed by the operation of the multiplier 411 may be reduced. For example, information about power consumption of the multiplier may be provided with reference to FIG. 5. When the processing element PE is deactivated, the adder 412 may also be configured to be deactivated. Accordingly, the power consumed by the operation of the adder 412 may be reduced. For example, information on power consumption of the adder may be provided with reference to FIG. 5.

In some examples, each processing element PE may be designed to receive a respective control signal from the second controller 100 for controlling (i.e., enabling or disabling) the zero-skipping operation.

In some examples, each multiplier 411 of each processing element PE may be designed to receive a respective control signal from the first controller 100 for controlling zero-skipping operations. According to the configurations described above, the power consumption of the multipliers can be reduced by zero-skipping.

In some examples, each adder 412 of each processing element PE can be designed to receive a respective control signal from the second controller 100 for controlling the zero-skipping operation. According to the configurations described above, the power consumption of the adders can be reduced by zero-skipping.

In some examples, each of the multiplier 411 and adder 412 of each processing element PE may be designed to simultaneously receive a respective control signal for controlling the zero-skipping operation from the second controller 100. According to the configurations described above, the power consumption of the multipliers and adders may be reduced by zero-skipping.

In some examples, the weights are constant parameters that have been trained, and the machine code from which the neural network model comprising the weights has been compiled may be programmed to input respective control signals for controlling the zero-skipping operation to each of the processing elements PEs at which values with zero weights are input.

The number of bits of data input to the first input and the second input may be determined according to the quantization of the node data and the weight data of the respective layers of the neural network model. For example, the node data of the first layer may be quantized to 5 bits and the weight data of the first layer may be quantized to 7 bits. In such a case, the first input may be configured to receive 5-bit data and the second input may be configured to receive 7-bit data, i.e., the number of bits of data input to each input may be different.

The processing element PE may be configured to receive quantization information of the data input to each input. The neural network data locality information may include quantization information of the input data and output data of the processing element PE.

In some examples, the processing core 1000-1 may be controlled so that the quantized data stored in the internal memory 300 is converted dynamically as the quantized bitwidth information is input to the inputs of the processing element PE. That is, different tensors may have different quantized bitwidth, and the processing element PE may be configured to generate input data by receiving bitwidth information from the processing core 1000-1 in real-time as the bitwidth of the incoming data is converted.

The accumulator 413 uses the adder 412 for a number of (L) loops to accumulate the operation value of the multiplier 411 and the operation value of the accumulator 413. Thus, the number of bits of data at the output and input of the accumulator 413 may be output as (N+M+log 2(L)) bits, where L is an integer greater than zero.

Once the accumulator 413 has finished accumulating, the accumulator 413 may receive an initialization reset signal to initialize the data stored inside the accumulator 413 to zero. However, the examples according to the present disclosure are not limited thereto.

The accumulator 413 is configured to store the accumulated value even when zero-skipping is enabled in the corresponding processing element PE. Thus, subsequent values can be accumulated even when zero skipping is enabled.

The bit quantization unit 414 may reduce the bitwidth in the data output from the accumulator 413. The bit quantization unit 414 may be controlled by the second controller 100. The bitwidth of quantized data may be output as (X) bits, where X is an integer greater than zero. According to the above-described configuration, the processing element array is configured to perform a MAC operation, and the processing element array has the effect that the MAC operation result can be quantized and output. In particular, such quantization has the effect of further reducing power consumption as the number of (L) loops increases. Reducing power consumption also has the effect of reducing heat generation in edge devices. In particular, reducing heat generation has the effect of reducing the possibility of malfunctioning operations caused by high temperatures of the processing core 1000-1.

The output data (X) bits of the bit quantization unit 414 may be equal to or different from the (N) bits and/or (M) bits. For example, the (X) bit may be set to a bitwidth such that an overflow of the output data (X) bit does not occur based on a maximum value that can be accumulated in the accumulator 413. For example, (X) bit may be 16 bits, 24 bits, or 32 bits.

The processing element array of the processing core 1000-1 according to one example of the present disclosure may include a multiplier 411, an adder 412, an accumulator 413, and a bit quantization unit 414. The bit quantization unit 414 may reduce the number of bits of data in (N+M+log 2(L)) bits output from the accumulator 413 by the processing element array to a number of bits in (X) bits. The second controller 100 may control the bit quantization unit 414 to reduce the number of bits in the output data by a predetermined number of bits from the least significant bit (LSB) to the most significant bit (MSB).

In some examples, the quantization level can be determined for each of the tensors of the neural network model separately.

According to the processing element PE, by adjusting the number of bits of the (N) bit data and the (M) bit data of the multiplier 411 and determining the number of bits of the operation value (X) bit by the bit quantization unit 414, the processing element array has the effect of preventing an overflow of the MAC operation.

Figure 4:
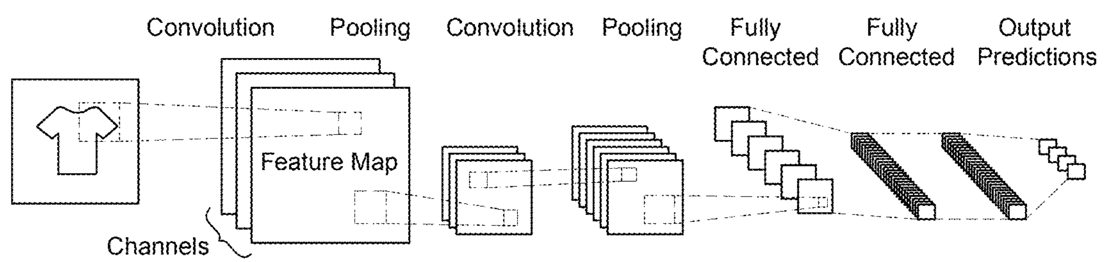
FIG. 4 is a schematic diagram illustrating a neural network of one example.

FIG. 4 is a schematic diagram illustrating a neural network of one example. An exemplary convolutional neural network may be a combination of one or more convolutional layers, a pooling layer, and a fully-connected layer. Convolutional neural networks have a structure suitable for training and inference of two-dimensional data, and may be trained via a backpropagation algorithm.

In one example of the present disclosure, a convolutional neural network has a kernel for each channel that extracts features of the input image of the channel. The kernel may be organized as a two-dimensional matrix and performs convolutional operations as it traverses the input data. The size of the kernel can be arbitrary, and the stride at which the kernel traverses the input data can also be arbitrary. The result of convolution over the entire input data per kernel may be referred to as a feature map or activation map.

As used herein, a kernel may comprise a single set of weights or a plurality of sets of weights. The number of kernels for each layer may be referred to as the number of channels.

As such, since the convolutional operation is a combination of the input data and the kernels, an activation function may be subsequently applied to add nonlinearity. When an activation function is applied to a feature map that is the result of a convolutional operation, it may be referred to as an activation map.

Referring specifically to FIG. 4, a convolutional neural network may include at least one convolutional layer, at least one pooling layer, and at least one fully connected layer. For example, a convolution can be defined by two main parameters: the size of the input data (typically a 1×1, 3×3, or 5×5 matrix) and the depth (number of kernels) of the output feature map. These key parameters can be computed by convolution. These convolutions can start at a depth of 32, continue to a depth of 64, and terminate at a depth of 128 or 256. The convolution operation may mean sliding a kernel of size 3×3 or 5×5 over the input data, the input image matrix, multiplying each weight of the kernel by each element of the overlapping input image matrix, and then adding them all together.

An activation function may be applied to the output feature map thus generated, resulting in the final output of an activation map. The pooling layer may perform a pooling operation to down-sample the output data (i.e., the activation map) to reduce the size of the feature map. For example, the pooling operation may include, but is not limited to, max pooling and/or average pooling.

The max pooling operation uses the kernel and outputs the maximum value in the region of the feature map where the feature map and kernel slide and overlap the kernel. The average pooling operation outputs the average value within the region of the feature map where the feature map and kernel slide and overlap the kernel. Because these pooling operations reduce the size of the feature map, they also reduce the number of parameters in the feature map.

The fully-connected layer may classify the data output from the pooling layer into a plurality of classes (i.e., estimates), and output the classified classes and their scores. The data output from the pooling layer is in the form of a three-dimensional feature map, which can be converted to a one-dimensional vector and input to the fully-connected layer.

In one example, with further reference to FIG. 2, a neural network model processed by processing core 1000-1 according to one example of the present disclosure may be related to image classification and object detection.

For example, the input data of the processing element array 400 of the neural processing unit 1000 that processes the neural network model described above may be image data, and the output data of the processing element array 400 may be a plurality of bounding box data for the input image. Each of the plurality of bounding box data may include bounding box coordinate data and class data. The bounding box coordinate data for the bounding box may include a location confidence score, height data, width data, X-coordinate data, and Y-coordinate data. The bounding box coordinate data may include the height data, the width data, the X-coordinate data, and the Y-coordinate data as described above, assuming that the shape of the bounding box is a rectangle. However, the shape of the bounding box is not limited to a square, but may be transformed into a pentagon or more polygon or a circle, and accordingly, the number and type of the bounding box coordinate data may vary according to the shape of the bounding box. Further, the class data may include a plurality of classes categorized as existing inside the bounding box and a score thereof.

FIG. 5 is a table illustrating energy consumption per unit operation of a neural processing unit, according to one example of the present disclosure. FIG. 5 will be described with respect to the power consumption reduction technology of the internal memory 300 of the processing core 1000-1. The table schematically explains energy consumed per unit operation of the processing core 1000-1. Energy consumption can be divided into memory access, addition operation, and multiplication operation. "8b Add" refers an 8-bit integer addition operation of the adder 412. An 8-bit integer addition operation may consume 0.03 pj of energy. "16b Add" refers to the 16-bit integer addition operation of the adder 412. A 16-bit integer addition operation may consume 0.05 pj of energy. "32b Add" refers a 32-bit integer addition operation of the adder 412. A 32-bit integer addition operation may consume 0.1 pj of energy. "16b FP Add" refers a 16-bit floating-point addition operation of the adder 412. A 16-bit floating-point addition operation may consume 0.4 pj of energy. "32b FP Add" refers a 32-bit floating-point addition operation of the adder 412. A 32-bit floating-point addition operation may consume 0.9 pj of energy. "8b Mult" refers an 8-bit integer multiplication operation of the multiplier 411. An 8-bit integer multiplication operation may consume 0.2 pj of energy. "32b Mult" refers a 32-bit integer multiplication operation of the multiplier 411. A 32-bit integer multiplication operation may consume 3.1 pj of energy. "16b FP Mult" refers a 16-bit floating-point multiplication operation of the multiplier 411. A 16-bit floating-point multiplication operation may consume 1.1 pj of energy. "32b FP Mult" refers a 32-bit floating-point multiplication operation of the multiplier 411. A 32-bit floating-point multiplication operation may consume 3.7 pj of energy. "32b SRAM Read" refers to a read access of 32 bits of data when the internal memory 300 is a static random access memory (SRAM). Reading 32 bits of data from the internal memory 300 may consume 5 pj of energy. "32b DRAM Read" refers to a read access of 32 bits of data when the main memory 3000 is DRAM. Reading 32 bits of data from the memory 3000 to the internal memory 300 can consume 640 pj of energy. The unit of energy is the pico-joule (pj).

When the processing core 1000-1 performs 32-bit floating point multiplication versus 8-bit integer multiplication, the energy consumption per unit operation is approximately 18.5 times different. When reading 32-bit data from the memory 3000 configured as DRAM and reading 32-bit data from the internal memory 300 configured as SRAM, the energy consumption per unit operation is approximately 128 times different.

In other words, from a power consumption perspective, power consumption increases as the number of bits in the data increases. Also, floating-point operations consume more power than integer operations. Also, reading data from DRAM increases power consumption dramatically.

Therefore, the internal memory 300 of the processing core 1000-1 according to one example of the present disclosure may be configured to include a high-speed static memory such as an SRAM tube and not include DRAM. However, the neural network processing unit according to examples of the present disclosure is not limited to SRAM.

For example, the internal memory 300 may not include DRAM, and the internal memory 300 may be configured to include static memory configured to have relatively higher read and write speeds and consume relatively less power than the memory 3000.

Accordingly, the internal memory 300 of the processing core 1000-1 according to one example of the present disclosure may be configured to have a relatively higher read and write speed and consume relatively less power for the inference operations of the neural network model than the memory 3000.

Static memories such as SRAM, MRAM, STT-MRAM, eMRAM, and OST-MRAM may be driven at high speeds,. Furthermore, MRAM, STT-MRAM, eMRAM, and OST-MRAM are static memories and have non-volatile characteristics. Thus, a static memory capable of high-speed operation, such as SRAM, may have the effect that the neural network model does not need to be provided redundantly from the memory 3000 upon rebooting after a power failure. However, examples according to the present disclosure are not limited thereto.

According to the above-described configuration, the processing core 1000-1 has the effect of greatly reducing the power consumption by the DRAM during the inference operation of the neural network model. Furthermore, a memory cell of the SRAM of the internal memory 300 may comprise, for example, four to six transistors to store one bit of data. However, examples according to the present disclosure are not limited thereto. Further, a memory cell of the MRAM of the internal memory 300 may comprise, for example, one magnetic tunnel junction (MTJ) and one transistor to store one bit of data.

Figure 6A:
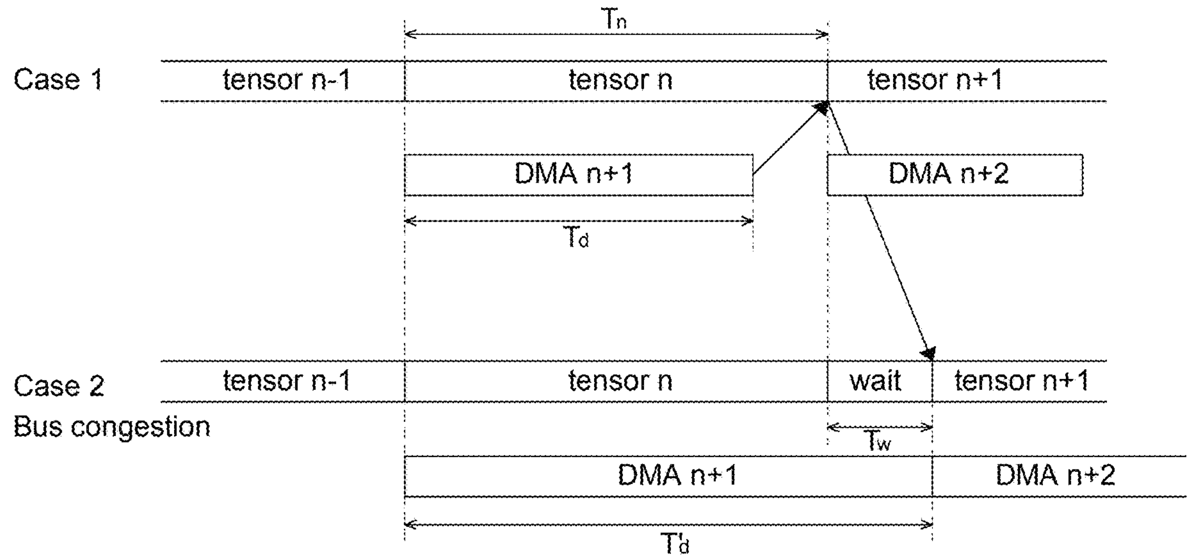
FIG. 6A and FIG. 6B are timing diagrams illustrating an example operation to reduce latency in a tensor where bus congestion occurs in a system for controlling a processing core, according to a first example of the present disclosure.
Figure 6B:
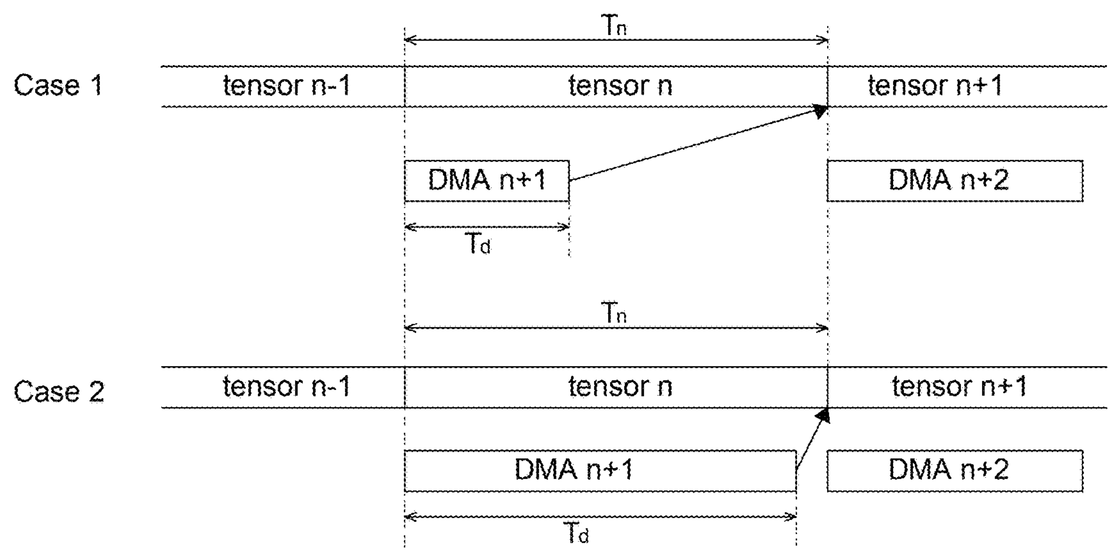

FIG. 6A and FIG. 6B are diagrams illustrating an example operation to reduce latency in a tensor where bus congestion occurs in a system for controlling a processing core according to a first example of the present disclosure.

Referring to FIG. 6A and FIG. 6B, when a tensor n of the neural network model is processed in the neural processing unit, it is preferred that the data required for the operation of the subsequent tensor n+1 be prefetched through DMA (using the DMA to transfer tensor n+1 is hereinafter referred to as "DMA n+1"). In refers to a time during which the neural processing unit performs computation on tensor n. $T_d$ refers to the time taken for the DMA to transfer tensor n+1 to the internal memory of the neural processing unit. The DMA transfer of tensor n+1 may be performed, for example, as a prefetch operation. If the prefetching of DMA n+1 for the computation of tensor n+1 is completed before the neural processing unit completes the computation of tensor n, the neural processing unit can process the computation of tensor n+1 without data starvation. Conversely, if the prefetch of DMA n+1 is not completed by the time the operation of tensor n is completed, the computation on tensor n+1 may be delayed.

As shown in case 1 in FIG. 6A, when DMA n+1 is prefetched during $T_d$ which is shorter than $T_n$ during which tensor n is computed by the neural processing unit, computation operation using tensor n+1 may start without delay. That is, while tensor n is being computed in the neural processing unit during $T_n$, DMA 200 can transfer the parameters for performing computing operations using tensor n+1 in the internal memory 300 via bus 6000. However, in case 2, if the DMA n+1 time is increased to $T'_d$, and the computing operation using tensor n+1 may start after tensor n is terminated and $T_w$ expires.

Accordingly, the system according to one example of the present disclosure may adjust the order and/or time of performing operation on each tensor as shown in FIG. 6B to adjust the QoS of the DMA to reduce $T_w$, i.e., the latency (time when the computational circuitry is not operating), even when bus congestion occurs in the DMA. The QoS of the DMA may be represented, for example, by (i) parameters indicating priority or urgency of memory request, (ii) parameters associated with bus bandwidth (e.g., guaranteed bandwidth, maximum bandwidth, percentage of total bandwidth), parameters indicating admissible latency of data transfer, caching parameters, parameters indicating jitters, and parameters indicating packet loss. As described below, one or more of these QoS parameters may be controlled per tensor basis so that tensors may be prefetched timely and efficiently for computation operations by a neural processing unit.

Time $T_n$ during which the computation of tensor n is performed may be determined at the time of compilation or be monitored in real-time. Also, the amount of data for DMA n+1 to be performed in that time is determined. However, like $T_n$, the operation time $T_d$ of DMA n+1 may be difficult to calculate or predict because the bandwidth that can be allocated to DMA varies according to the bus conditions. Furthermore, the bus of the system may be allocated in real-time for transferring data between various circuits (e.g., CPU, PCIe) other than for data between the memory and the neural processing unit. Thus, a theoretical version of time $T_d$ may in practice increase according to the actual condition of the bus.

The interval during which the neural processing unit computes the tensor n, i.e., the computation clock cycles of the tensor n, may be referred to as $T_n$. On the other hand, the interval of time that the neural processing unit needs to be transferred via DMA for the computation of tensor n+1, i.e., the memory cycle of DMA n+1, may be referred to as $T_d$. However, $T_d$ may be variably increased according to the situation on the bus.

Comparing the respective cycles of $T_n$ and $T_d$, if $T_n$ is much larger than $T_d$, as in case 1 in FIG. 6B, the completion time of the prefetch of DMA n+1 is relatively faster than the completion time of the computation of tensor n, and the system can determine that there is a large probability that $T_d$ is smaller than $T_n$ even considering the various dynamic situations on the bus because there is sufficient time margin for DMA.

On the other hand, if $T_n$ is not significantly larger than $T_d$ (such as in case 2 in FIG. 6B), the prefetch completion time of DMA n+1 is relatively faster than the computation completion time of tensor n. Hence, the probability that $T_d$ becomes larger than $T_n$ increases with if time for data transfer using DMA becomes insufficient due to bus congestion.

That is, a system according to an example may prioritize DMA n+1 sent over the bus when a value of $$\frac{T_d}{T_n}$$

is equal to or greater than one, based on the ratio of $T_n$ to $T_d$. That is, a system according to one example of the present disclosure may be configured to prioritize DMA n+1 transmitted on the bus based on the ratio of $T_n$ to $T_d$, based on the value of $$\frac{T_d}{T_n},$$

and/or based on a preset threshold.

Further, the system according to an example may increase the priority of DMA n+1 sent over the bus based on a ratio of $T_n$ to $T_d$ and a congestion level of the bus, wherein the value of $$\frac{T_d}{T_n}$$

is compared with a predetermined threshold. The degree of congestion in the bus may be determined according to a bandwidth sharing of various additional circuits connected to the bus. The higher the degree of congestion of the bus, the greater the probability that $T_d$ be increased.

The threshold of $$\frac{T_d}{T_n}$$

may be set to, for example, 0.9. Accordingly, when $$\frac{T_d}{T_n} \geq 0.9,$$

the system may be configured to determine that the transfer of tensor n+1 is likely to be delayed and cause bus congestion. Hence, the bus transmission priority of DMA n+1 is increased to prevent the delayed transfer of tensor n+1. However, the above threshold value may be appropriately determined according to the degree of congestion of the bus, and the present disclosure is not limited thereto.

As an alternative or in addition, the threshold value of the modified formula, $$\frac{T_n}{T_d} \leq 1.1,$$

may be set to, for example, 1.1. Accordingly, when $$\frac{T_n}{T_d}$$

the system may be configured to determine that the transfer of tensor n+1 is likely to be delayed and cause bus congestion. Hence, the bus transmission priority of DMA n+1 is increased to prevent the delayed transfer of tensor n+1. However, the above threshold value may be appropriately determined according to the degree of congestion of the bus, and the present disclosure is not limited thereto.

As described above, by adjusting the QoS parameter of the DMA based on the value of $$\frac{T_d}{T_n}$$

to prioritize the bus bandwidth to transfer tensor n+1, the bus of the DMA can be used efficiently to reduce the latency $T_w$ associated with processing tensor n+1. For example, if the value of $$\frac{T_d}{T_n}$$

is less than the preset threshold, the QoS parameter may be decreased so that the priority associated with accessing the bus may be lowered, and if the value of $$\frac{T_d}{T_n}$$

is higher than the preset threshold, the QoS parameter may be increased so that the priority associated with accessing the bus may be increased.

Accordingly, the control system may increase the performance of each neural processing unit by increasing the priority of the DMA n+1 tensors that are likely to experience delayed transfer to the neural processing unit due to, for example, the bus congestion.

QOS mechanisms may be used to prioritize traffic on the bus, manage bandwidth allocation, and reduce latency, jitter, and packet loss to improve overall system performance. The parameters of the QoS may be controlled or adjusted to achieve, among others, the following:

Bandwidth allocation: controlling the bus to ensure that each processing core has sufficient bus bandwidth to receive and transfer data through the bus for its operation.

Priority levels: each tensor can be assigned a specific priority level. According to the priority, the bus bandwidth can be allocated differently and/or the order as indicated in order-queues of data requests on the bus can be adjusted. A bus may include additional order-queue memory.

Traffic shaping: Data flow can be controlled to increase or ensure performance, lower latency, and ensure bandwidth.

Resource reservation: Circuit units having high priority (e.g., neural processing units) can be reserved to maintain performance of the bus.

Figure 7:
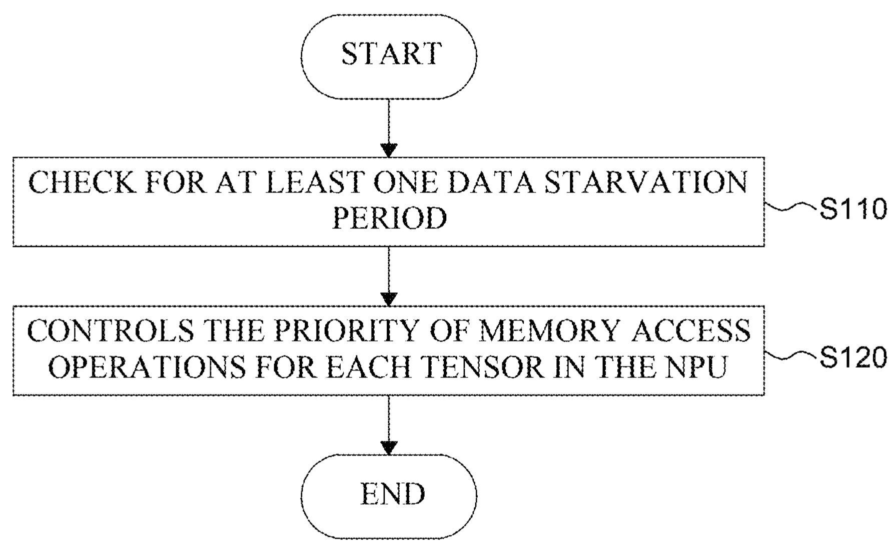
FIG. 7 is a flowchart illustrating a method for controlling a processing core, according to a first example of the present disclosure.

FIG. 7 is a flowchart illustrating controlling at a processing core according to a first example of the present disclosure. Such control methods may be performed by a first controller 1100 that controls the neural processing unit 1000. Referring to FIG. 7, the first controller 1100 may determine S110 at least one data starvation period of the neural processing unit 1000 based on the access operations to the memory 3000 for each tensor of the neural processing unit 1000 and the computation operations on the data.

In this case, the computation operations and memory access operations for each tensor may be performed within a given bus bandwidth for each of the neural processing units 1000 to communicate with the memory 3000.

To determine the data starvation period, the first controller 1100 may compare computation cycles and memory cycles for each tensor of the neural processing unit 1000. For this purpose, the first controller 1100 may receive or monitor computation cycle and memory cycle information for each tensor.

Specifically, the first controller 1100 may compare the first processing time (i.e., a computation cycle) that takes to complete a computation operation on a particular tensor, with the second processing time (i.e., a memory cycle) that takes to complete a memory access operation of the next tensor to follow the particular tensor, and identify the difference between the first processing time and the second processing time as a data starvation period. The first processing time and the second processing time are unique characteristics of tensors that are determined according to the size of the parameters of the tensors of the neural network model and the complexity of the computational algorithm. Accordingly, the first processing time and the second processing time may be analyzed in advance during the compilation phase of the neural network model.

Next, the first controller 1100 controls S120 the prioritization of memory access operations for each tensor of the neural processing unit 1000 such that data starvation periods do not occur or is reduced. The first controller 1100 may be configured to determine the priority for the memory access operation of the neural processing unit 1000 for the tensor in which at least one data starvation period occurs. The first controller 1100 may be configured to control the bus based on the determined prioritization.

When the first controller 1100 determines that the neural processing unit performing the computation operation of the tensor may suffer at least one data starvation period, the first controller 1100 may adjust parameters of the QoS to eliminate or reduce the identified data starvation period. That is, if the second processing time (i.e., a memory cycle) to complete a memory access operation is relatively long compared to the first processing time (i.e., a computation cycle), resulting in a data starvation period, the first controller 1100 may be give a high priority to that memory access operation of the tensor to be read in the second processing time. Conversely, if the first processing time to complete the computation operation is sufficiently long relative to the second processing time, the first controller 1100 may be configured to cede bus bandwidth by giving a low priority to the corresponding memory access operation.

If the first processing time is longer than the second processing time, the first controller 1100 may assign a lower priority to the neural processing unit requesting an memory access operation that has a relatively low probability of data starvation, such that the bus prioritizes the bus bandwidth allocation to circuits (e.g., other neural processing units, other processing cores, CPUs, decoders, image sensors, and the like) other than the neural processing unit.

In one aspect, if the second processing time is longer than the first processing time, the first controller 1100 may increase the priority of the neural processing unit requesting the memory access operation to reduce or eliminate the data starvation period of the neural processing unit, and the bus may process the memory access request operation of the neural processing unit first to further utilize the additional available bus bandwidth.

In some examples, the first controller 1100 may grant relatively higher bandwidth on the bus to a particular neural processing unit than other neural processing unit based on a first processing time and a second processing time for each of the tensors requested by each of the plurality of neural processing units. The bandwidth allocation of the bus may be dynamically adjusted to reduce a data starvation period associated with each tensor. Accordingly, the data starvation period of the plurality of neural processing units included in the system 10000 may be reduced or eliminated.

In other words, even if the second processing time to complete a memory access operation for a particular neural processing unit increases slightly, it can cede at least a portion of bus bandwidth to other neural processing units (i.e., with respect to neural processing units with overlapping memory access operations) as long as the primary processing time to complete the computation operation is long enough.

On the other hand, if the second processing time for completing the memory access operation for a particular neural processing unit is sufficiently long compared to the first processing time for completing the computation operation, the memory access operation can be completed faster by obtaining bus bandwidth from one or more other neural processing units (of which the memory access operation has an overlap in time with the particular neural processing unit) to acquire more memory access opportunities, thereby reducing the time during which the calculation circuit of the particular neural processing unit is not operating.

Figure 8:
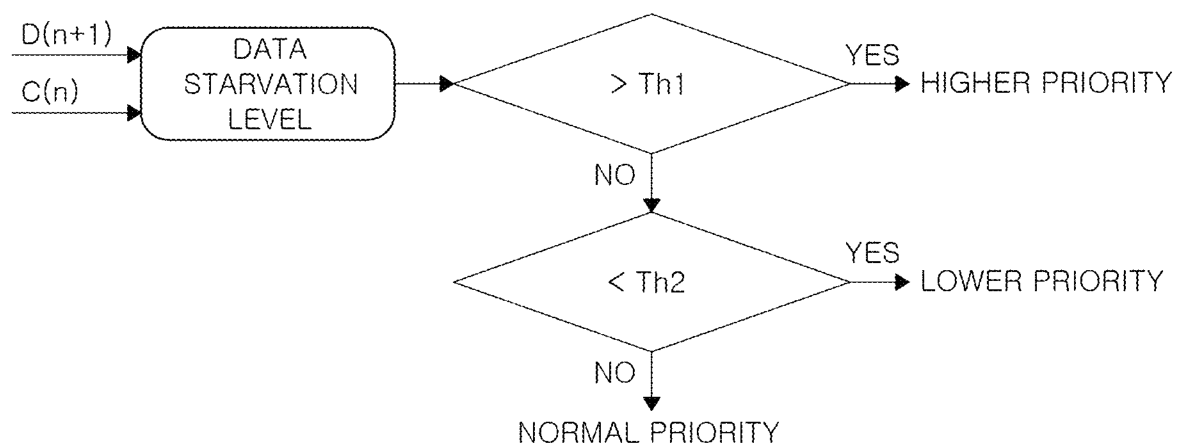
FIG. 8 is a diagram illustrating a method for determining priorities for sending tensors, according to a first example of the present disclosure.

FIG. 8 is a diagram illustrating an exemplary method for determining priorities for controlling a processing core according to a first example of the present disclosure. C(n) denotes the first processing time, which is the computation cycle for completing the computation operation of a particular tensor, and D(n+1) denotes the second processing time, which is the memory cycle for completing the memory access operation of the next tensor after that particular tensor. The first controller 1100 may assign a higher priority to the memory access request corresponding to D(n+1) when the second processing time is longer than the first processing time, i.e., when the data starvation level (e.g., D(n+1)/C(n)) is greater than the first threshold Th1 (e.g., Th1 is set to 1). Accordingly, the operation of D(n+1) of a particular neural processing unit may be accelerated by obtaining bus bandwidth from another neural processing unit. Accordingly, the total time for processing the data is reduced since the time during which the calculation circuit is not operated (i.e., the data starvation period) is reduced.

Further, the first controller 1100 may assign a lower priority to the memory access request corresponding to D(n+1) if the second processing time is less than the first processing time, i.e., if the data starvation level is less than the second threshold Th2 (e.g., Th2 is set to 1), since the first processing time is longer. Accordingly, at least a portion of the bandwidth allocated to the operation of D(n+1) may be at least partially given to one or more other neural processing units. As a result, the data starvation periods of the one or more other neural processing units are reduced or eliminated, reducing the total time spent by all of the neural processing units for processing the data is reduced.

On the other hand, the first controller 1100 may assign a normal priority to the data starvation period when the first processing time and the second processing time are equal, i.e., when the data starvation level is equal to the third threshold value (e.g., 1), as this corresponds to a case where the data starvation period does not exist.

In other words, the system of an example may calculate a data starvation level with respect to a particular tensor, and determine the tensor to have a high priority by comparing the data starvation level with a first threshold value. Further, the system may determine the tensor to have a low priority by comparing the data starvation level with a second threshold. Further, the system may maintain the priority of the tensor when the data starvation level and the third threshold are equal. The first threshold value and the second threshold value may be equal. Further, the second threshold value and the third threshold value may be equal.

In some examples, the first threshold may be greater than the third threshold. The second threshold may be smaller than the third threshold. The third threshold value may be a range between the first threshold value and the second threshold value. Specifically, for example, the first threshold may be one. When the data starvation level is one, the corresponding tensor is theoretically free of data starvation, but because various overheads and bandwidth contention may occur on the bus, it is considered likely that data starvation may occur, even briefly, and the priority should be increased. The second threshold may be 0.8. If the data starvation level is 0.8, even if various overhead and bandwidth contention occurs on the bus, the corresponding tensor is probabilistically free of data starvation and has enough bus bandwidth to cede, and the priority can be lowered. The third threshold may be a range between the first and second thresholds. When the data starvation level is between 0.7 and 1, it may be considered that data starvation is unlikely to occur even considering various overheads and bandwidth occupancy contention on the bus, but there may be insufficient bus bandwidth to cede. In other words, the system may be configured to calculate a data starvation level for each tensor, increase a priority of a tensor based on a first threshold, decrease a priority of a tensor based on a second threshold that is different from the first threshold, and maintain a priority of a tensor based on a value between the first threshold and the second threshold (i.e., a third threshold).

Figure 9:
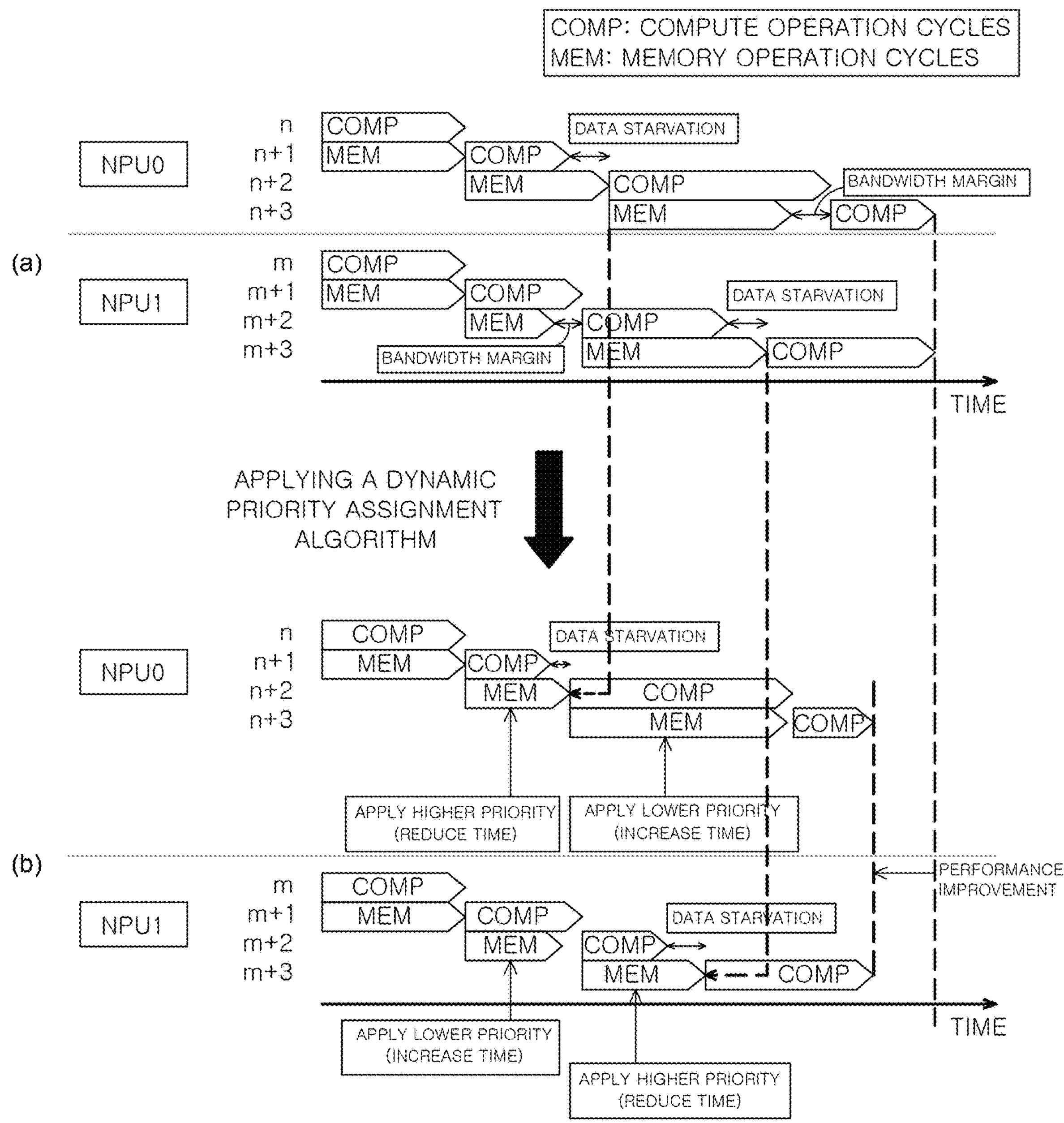
FIG. 9 is a diagram illustrating an improvement in data processing speed by giving priority to reduce a data starvation period of a processing core, according to a first example of the present disclosure.

FIG. 9 is a diagram illustrating an improvement in data processing speed by giving priority to reduce a data starvation period, according to a first example of the present disclosure. A memory cycle MEM and a computation cycle COMP of each tensor processed by each neural processing unit NPU are illustrated in FIG. 9. Each NPU may store necessary parameters in an internal memory during a respective memory cycle corresponding to each tensor, and to process an operation of a neural network model utilizing the parameters stored in the internal memory during a corresponding computation cycle. In other words, in order for a neural processing unit NPU to process one tensor, a DMA of the neural processing unit first commands a bus to transfer the tensor to an internal memory of the neural processing unit during a memory cycle by sending a memory operation request, and then a processing element of the neural processing unit performs computation using the tensor stored in the internal memory during a computation cycle.

Referring to FIG. 9, NPU0 refers to a neural processing unit. NPU0 may include a single processing core or a plurality of processing cores. For example, NPU0 may correspond to the neural processing unit 1000 of FIG. 2 or the processing core 1000-1 of FIG. 2. NPU1 refers to another neural processing unit. For example, NPU1 may correspond to the processing core **1000-*n* of FIG. 2**.

Referring to FIG. 9, as shown in (a), the first processing time (i.e., computation cycle) for the operation of the data in the first tensor n+1 processed by the NPU0 is shorter than the second processing time (i.e., memory cycle) for the memory access operation of the data in the second tensor n+2. Accordingly, a data starvation period occurs between the computation cycles of the first tensor n+1 and the second tensor n+2 of the NPU0 until the memory cycle of the second tensor n+2 of the NPU0 is completed. The bus bandwidth of the memory cycle of the second tensor m+2 of NPU1 that at least partially overlaps with the memory cycle of the second tensor n+2 of NPU0 on the time axis can be utilized. That is, because the memory cycle of the second tensor of NPU1 completes before the computation cycle of the first tensor of NPU1 m+1 completes, there is a bandwidth margin in the bus bandwidth of the memory cycle of the second tensor of NPU1 m+2 before the computation cycle of the second tensor of NPU1 m+2 begins. Thus, ceding at least a portion of the bus bandwidth assigned for the memory cycle of the second tensor m+2 of NPU1 to NPU0 may result in substantially elimination of data starvation between the computation cycle of the first tensor m+1 and the computation cycle of the second tensor m+2 of NPU1.

In other words, a system according to one example may compare memory cycles and computation cycles of successively processed tensors to determine one or more data starvation periods or one or more bandwidth reserve period.

That is, the system according to the first example may determine a data starvation period between successive tensors that are each processed in a first neural processing unit of the plurality of neural processing units. Further, the system according to the first example of the present disclosure may be configured to determine, among the tensors processed in the second neural processing unit of the plurality of neural processing units, a tensor whose reserved transfer bandwidth of the bus can afford to be ceded at least partially to another tensor whose extended transfer over the bus is likely to or have already resulted in the data starvation period. Accordingly, the system according to one example may reallocate the bus bandwidth previously allocated to the neural processing unit with sufficient bus bandwidth to another neural processing unit experiencing or likely to experience a data starvation period.

For example, by assigning a high priority to the memory access operation of the second tensor n+2 of NPU0 and a low priority to the memory access operation of the second tensor m+2 of NPU1, as shown in (b), at least part of the bus bandwidth assigned to NPU1 may be reassigned to NPU0, thereby reducing the data starvation period of NPU0. At this time, NPU1 may not substantially experience a data starvation period in the second tensor m+2 of NPU1 because NPU1 is in a bandwidth reserve period.

On the other hand, as shown in (a), the memory cycle of the third tensor m+3 of NPU1 is longer than the computation cycle of the second tensor m+2 of NPU1. Accordingly, until the memory cycle of the third tensor m+3 of NPU1 is completed, a data starvation period occurs between the computation cycle of the second tensor m+2 of NPU1 and the computation cycle of the third tensor m+3 of NPU1. Since the computation cycle of the second tensor n+2 of NPU0 is longer than the memory cycle of the third tensor n+3 of NPU0, there is a bandwidth slack in the memory cycle of the third tensor n+3 of NPU0. Accordingly, at least a portion of the bus bandwidth of the memory cycle assigned to transfer the third tensor n+3 of NPU0 may be reallocated to expediently transfer the third tensor m+3 of NPU1 over the bus.

Accordingly, a controller (e.g., a first controller) of the system according to the first example may adjust the priority of the memory access operations of the third tensor n+3 of NPU0 and the third tensor m+3 of NPU1, respectively. Accordingly, by assigning a high priority to memory access operations of the third tensor m+3 of NPU1 and a low priority to the third tensor n+3 of NPU0, as in (b), at least a portion of the bus bandwidth of NPU0 may be reassigned to NPU1 to reduce a data starvation period of the third tensor m+3 of NPU1.

In summary, the system according to the first example may be configured to determine a data starvation period for each tensor of the one neural processing unit, determine a bus bandwidth reserve period for a tensor of the other neural processing unit that overlaps along a time axis with the data starvation period, and reduce the data starvation period by adjusting a priority differently for each of the tensor having the data starvation period and the tensor having the bandwidth reserve period. Referring to (a) and (b) of FIG. 9, when at least a portion of the memory cycles of the tensor having the data starvation period and the memory cycles of the tensor having the bandwidth reserve period overlap, both the processing time of NPU0 and NPU1 may be reduced by adjusting the priority of the memory access operations of each of the tensors, respectively.

Hereinafter, the second example and the third example of the present disclosure will be described where operations for checking status information of each neural processing unit in real-time are performed without comparing computation cycles and memory cycles of each tensor of the neural processing unit 1000 so that appropriate priorities can be given to each tensor to reduce data starvation periods.

Figure 10:
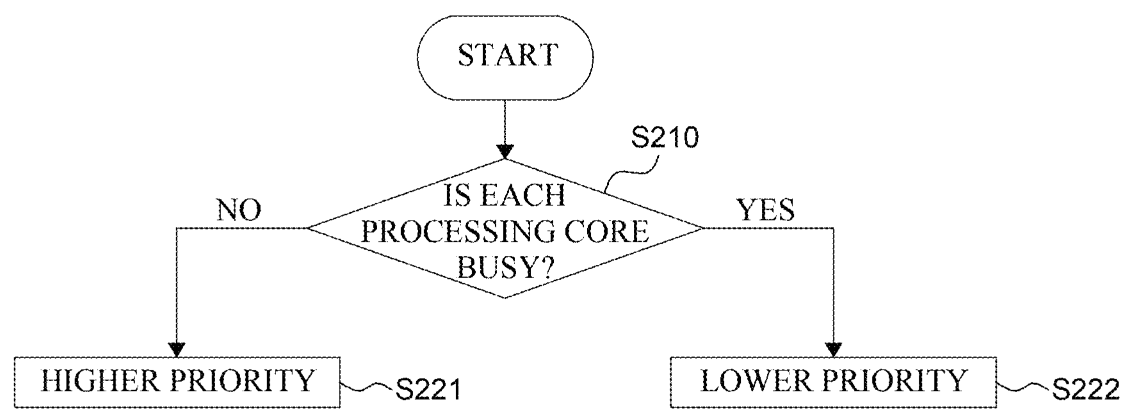
FIG. 10 is a flowchart illustrating an example of a method for determining priorities in controlling a processing core, according to a second example of the present disclosure.

FIG. 10 is a diagram illustrating an example of a method for determining priorities in a method for controlling a processing core according to a second example of the present disclosure. The first controller 1100 may receive status information from the second controller 100 of each of the processing cores 1000-1, . . . , **1000-*n*, and may determine whether each of the processing cores 1000-1, . . . , 1000-*n* is in a busy status based on the received status information S210**. The busy status is an indication of whether the processing core is in use or in processing. The status information may be updated in real-time.

Next, a priority of each processing core 1000-1, . . . , **1000-*n* may be determined according to the determination in step S210, wherein a high priority may be given S221 to a processing core that is not in a busy status and a low priority may be given S222** to a processing core that is in a busy status. The busy status for a processing core indicates a busy status where the computation operations of a particular tensor are being performed, and therefore it is given a low priority because the memory access operations for the next tensor do not need to be performed quickly. A non-busy status for a processing core indicates a data starvation status where the computation operations of the next tensor are not being performed, and therefore it is given a high priority because the memory access operations for the next tensor need to be performed quickly.

According to the adjusted priorities, the order-queue of the bus 6000 may be reordered. The reordered order-queue may be stored in order-queue memory or reordered. According to a second example of the present disclosure, the first controller 1100 may determine the busy status of each NPU and reorder the order-queue of the bus 6000 according to the priority. However, the present disclosure is not limited thereto, and the order-queue on the bus 6000 may also be configured to be reordered by at least one of the second controller 100, the CPU 2000, the DMA 200, or the bus 6000.

Figure 11:
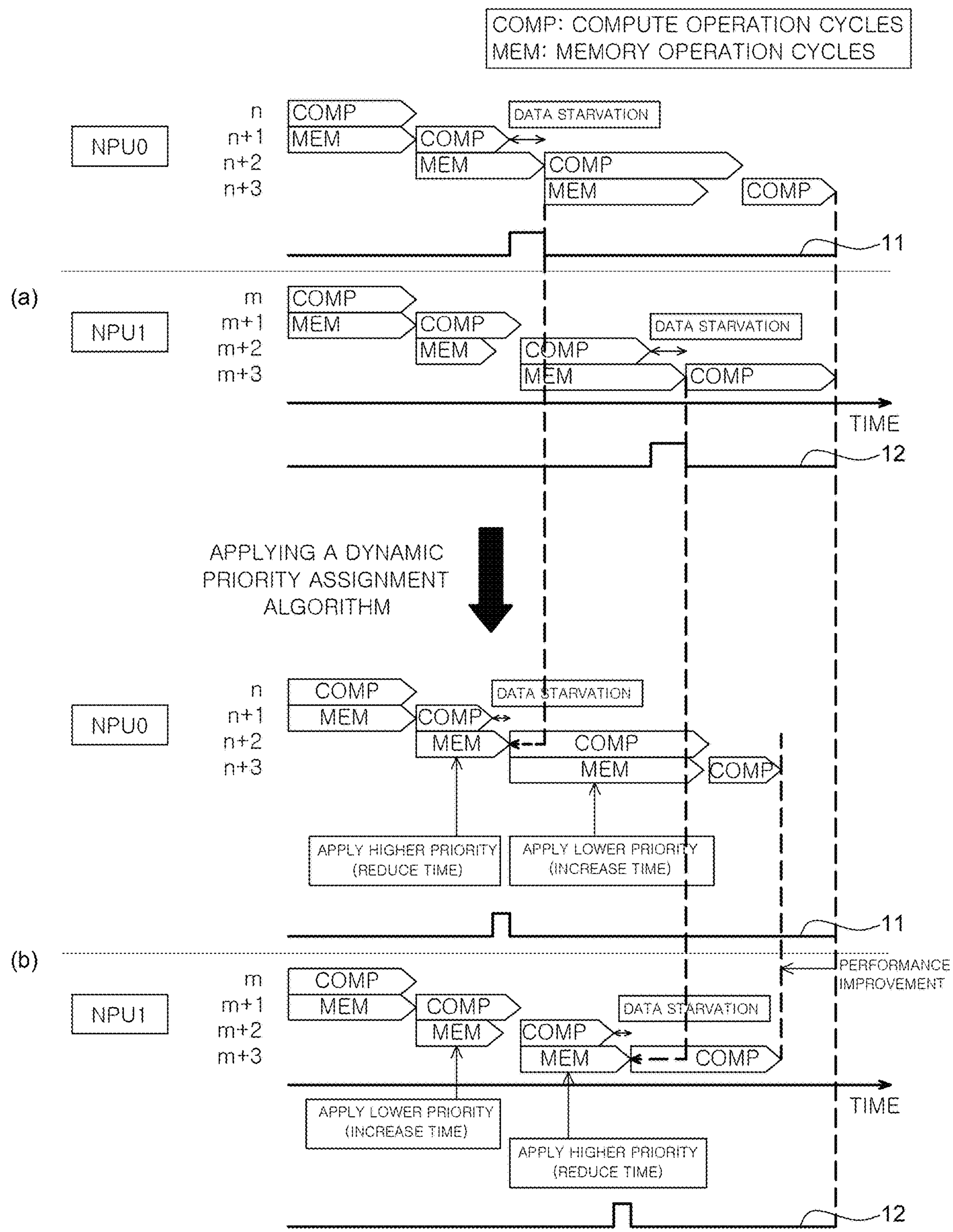
FIG. 11 is a timing diagram illustrating an example of a data starvation signal generated in runtime of a processing core, according to a second example of the present disclosure.

FIG. 11 is a diagram illustrating an example of a data starvation signal generated during a runtime of a processing core according to a second example of the present disclosure. FIG. 11 is similar to FIG. 9 and redundant descriptions are omitted herein for the sake of brevity.

First, the second controller 100 of each processing core 1000-1, . . . , **1000-*n* may send its status information in the form of a data starvation signal 11 and 12. The data starvation signal is a signal indicating that the processing element PE is in an idle status during runtime of a processing core. The data starvation signal may refer to a status in which the computational operations of the processing cores have stopped. The status information of each processing core 1000-1, . . . , 1000-*n* may be generated by checking the status of the components controlled by each second controller 100. Each data starvation signal may be an independent signal. As will be described further below, the signal indicating the idle status information may be generated by the second controller 100**.

Referring to FIG. 11, for NPU0, as in (a), NPU0 deactivates the first data starvation signal 11 in a busy status processing the computation operation COMP of the first tensor n. For example, the deactivation signal may be a first-level signal and the activation myth may be a second-level signal. Alternatively, the deactivation signal may be a second level signal, and the activation signal may be a first level signal. The first level may be indicated by a low-level voltage signal and the second level may be indicated by a high-level voltage signal with a voltage higher than the low-level voltage signal. Further, the NPU0 may disable the first data starvation signal 11 in a busy status of processing the computation operation COMP of the first tensor n+1. Between the oth tensor n and the first tensor n+1 of the NPU0, a data starvation period caused by a memory access operation MEM does not occur. Then, the NPU0 activates the first data starvation signal 11 in a data starvation status in which the computation operation COMP of the first tensor n+1 is completed but the computation operation COMP of the second tensor n+2 is not performed. Accordingly, as shown in (b), the first controller 1100 may be configured to give a higher priority to the processing core for which the first data starvation signal 11 is enabled. Accordingly, the bus bandwidth of the memory access operation MEM of the high prioritized tensor n+2 may be increased, and thus, the data starvation period shown in (b) may be reduced compared to (a).

Further, in some examples, the first controller 1100 may assign a low priority to the other processing core when the first data starvation signal 11 is activated and the second data starvation signal 12 of the other processing core is deactivated. In such a case, the first data starvation period illustrated in (b) may be further reduced.

Meanwhile, for NPU1, as in (a), NPU1 may deactivate the second data starvation signal 12 in the busy status of processing the computation operation COMP of the first tensor m. Subsequently, NPU1 may disable the second data starvation signal 12 in a busy status that processes the computation operation COMP of the first tensor m+1. Accordingly, between the first tensor m and the second tensor m+1 of the NPU1, there is no data starvation period caused by the memory access operation MEM.

The NPU1 may deactivate the second data starvation signal 12 in a busy status in which the computation operation COMP of the second tensor m+2 is being performed. The NPU1 may activate the second data starvation signal 12 in a data starvation status in which the computation operation COMP of the second tensor m+2 has been completed, but the computation operation COMP of the third tensor m+3 is not being performed.

Accordingly, as shown in (b), the first controller 1100 may be configured to give a higher priority to the processing core for which the second data starvation signal 12 is enabled. The bus bandwidth of the memory access operation MEM of the high prioritized tensor m+3 may be increased, and thus, the data starvation period shown in (b) may be reduced compared to (a).

Furthermore, in some examples, the first controller 1100 may be configured to give a lower priority to the other processing core when the second data starvation signal 12 is enabled and the first data starvation signal 11 of the other processing core is disabled. In such a case, the second data starvation period illustrated in (b) may be further reduced.

As described above, the first controller 1100 may be configured to enable real-time prioritization by checking the busy status according to the data starvation signals 11 and 12 received from each of the processing cores 1000-1, . . . , **1000-*n* in real-time, rather than comparing the cycles for each tensor processed by the plurality of processing cores 1000-1, . . . , 1000-*n*. Furthermore, by causing each processing core 1000-1, . . . , 1000-*n*** to cede bus bandwidth by showing its priority according to whether it is in a busy status, the data starvation period can be reduced to enable the calculation circuit to operate quickly.

Figure 12:
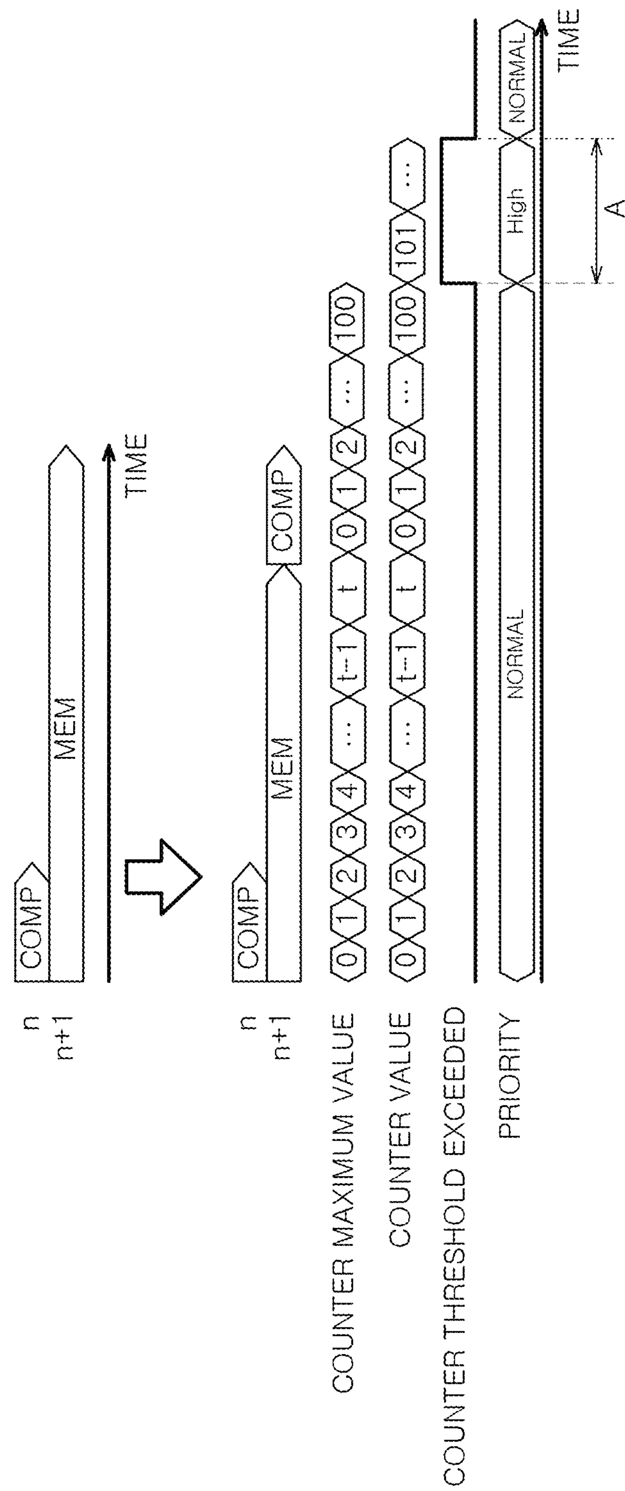
FIG. 12 is a timing diagram illustrating a method for determining a priority to reduce a delay identified according to a counting value of a counter, according to a third example of the present disclosure.

FIG. 12 is a diagram illustrating one example method for determining a priority to reduce a delay identified by a counting value of a counter (e.g., counter circuit), according to a third example of the present disclosure. Explanation on FIG. 12 that overlaps with those of FIG. 10 and FIG. 11 are omitted herein for the sake of brevity.

According to a third example, a counter may be provided at a particular location in the system 10000. The counter may be included in one of the first controller 1100, the neural processing unit 1000, the bus 6000, and the CPU 2000, and the present disclosure is not limited to the location of the counter. In the example of FIG. 2, counter 110 is illustrated as being included in the first controller 1100. Referring to FIG. 12, each of the processing cores 1000-1, . . . , **1000-*n*** may comprise a counter and may be configured to perform counting while the memory access operation is performed based on a counter threshold for the memory access operation. In this case, the number of clocks in the cycle of each memory access operation MEM may be pre-calculated based on the tensor size, and the counter maximum value may be the sum of the pre-calculated number of clocks (e.g., 0 to t clocks) based on the tensor size plus a certain number of clocks (e.g., 0 to 100 clocks).

On the other hand, a counter threshold value for the memory access operation may be preset, and each processing core 1000-1, . . . , **1000-*n*** may perform counting based on it.

When the counter value is below the counter threshold, each of the processing cores 1000-1, . . . , **1000-*n*** determines that a data starvation period has not occurred, and disables the data starvation signal for the remaining interval.

If the counter value of the counter of each of the processing cores 1000-1, . . . , **1000-*n* exceeds a preset threshold, it is determined that a data starvation period has occurred and the data starvation signal is activated for period A that exceeds a preset maximum counter value. The activation may be maintained until the memory access operation is completed. Accordingly, the interval for which the data starvation signal is activated is given a high priority by the first controller 1100**. According to the higher prioritization of the memory access operation due to activation of the data starvation signal, the bus bandwidth for the memory access operation is increased, which causes the data starvation period to be reduced. Upon completion of the memory access instruction, the counter may be reset, and the priority may be lowered again.

For example, as illustrated in FIG. 12, when the counter threshold is set to t+100 clocks, each of the processing cores 1000-1, . . . , **1000-*n*** may disable the data starvation signal for an interval in which the counter value is below the counter threshold, and enables the data starvation signal for an interval in which the counter value exceeds the counter threshold. The threshold value may be appropriately determined by considering the characteristics of various communication networks, i.e., when the counter threshold value is exceeded, it is determined that a bottleneck has occurred on the bus.

As described above, by having a counter to perform counting for each of the processing cores 1000-1, . . . , **1000-*n*, and by allowing the first controller 1100 to determine its busy status via a data starvation signal that is activated accordingly, the first controller 1100 can dynamically adjust its priorities. Further, by allowing each processing core 1000-1, . . . , 1000-***n* to cede bus bandwidth by prioritizing according to whether it is in a busy status, calculation circuits with reduced data starvation periods can be enabled to operate.

Figure 13:
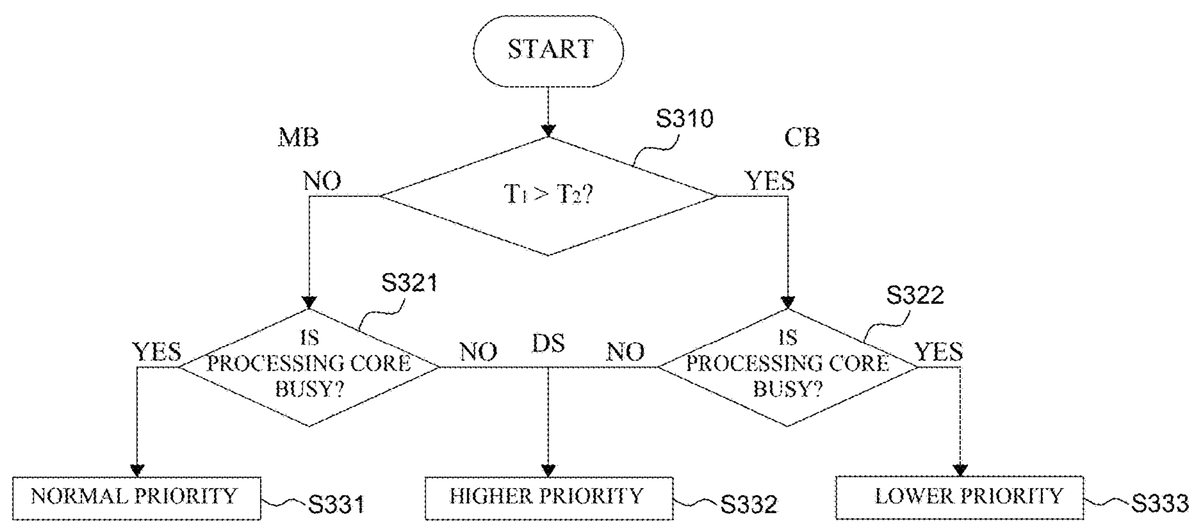
FIG. 13 is a flowchart illustrating a method for determining a priority of sending tensors, according to a fourth example of the present disclosure.

The following describes a fourth example in which both the first example and the second/third example of the present disclosure are applied. FIG. 13 is a diagram illustrating determining of a priority, according to the fourth example of the present disclosure. The first controller 1100 may compare S310 clock cycles for computation operations and memory access operations for each tensor of the neural processing unit 1000 to identify at least one data starvation period. Information about the duration of each computation cycle and each memory cycle of each tensor of a neural network model may be included in the neural network model to be processed by the neural processing unit. At step S310, the first controller 1100 may be configured to compare a first processing time $T_1$ (e.g., a computation cycle) for completing a computation operation at a particular tensor to a second processing time $T_2$ for completing a memory access operation (e.g., a memory cycle) for reading data required for a computation operation at the subsequent tensor after that particular tensor, and determine that an interval in which the second processing time $T_2$ is longer than the first processing time $T_1$ is a potential data starvation period. If the first processing time is not greater than the second processing time, i.e., if it may be determined that the computation cycle will complete faster than the memory cycle, the system may be configured to determine that a data starvation period is unlikely to occur. Accordingly, the first processing time $T_1$ and the second processing time $T_2$ for each tensor may be compared. The first processing time $T_1$ and the second processing time $T_2$ are included in the neural network model, and the neural processing unit may be provided with the information in advance. If the first processing time $T_1$ is greater than the second processing time $T_2$, the tensor is determined to be in the compute bound CB interval. If the first processing time $T_1$ is shorter than the second processing time $T_2$, the tensor is determined as the memory bound interval MB. The first and second processing time information may be included in the respective neural network models, and are initial values determined based on the tensor sizes. The second processing time may vary in real-time according to the real-time bandwidth allocation of the bus.

Next, based on the data starvation signal generated by the second controller 100, it can be determined in real-time whether the NPU is in a busy status. Specifically, for a memory bound tensor, based on a data starvation signal received from the second controller 100 of each processing core 1000-1, . . . , 1000-*n*, the second controller 100 may determine S321 whether the corresponding processing core is in a busy status. If the computation cycle is completed faster than the memory cycle, the start of the computation cycle of the subsequent tensor is likely to be delayed until the memory cycle is completed, i.e., a data starvation period is likely to occur.

At step S310, the priority assigned to the memory cycles of the tensor that are predicted to encounter a data starvation period determined based on the first processing time $T_1$ and the second processing time $T_2$ may be one of a default priority and a high priority.

At step S321, the first controller 1100 may give the processing core a default priority if it is in a busy status S331, i.e., although it was predicted at step S310 that a data starvation period is likely to occur, the confirmation that the NPU is in a busy status confirms that a data starvation period is not actually occurring. Accordingly, at step S331, the processing core can retain its default priority based on the reason that it is still performing the computation operation.

At step S321, the first controller 1100 may give the corresponding processing core a high priority if the corresponding processing core is not in a busy status S332, i.e., it was predicted at step S310 that a data starvation period is likely to occur on the corresponding processing core, and it was confirmed at step S321 that the computation on the corresponding processing core has actually stopped. Thus, the corresponding processing core may be viewed as being in a data starvation status DS and may be configured to receive a high bus bandwidth with a high priority set.

On the other hand, for the compute bound tensor, based on the data starvation signal received from the second controller 100 of each processing core 1000-1, . . . , 1000-*n*, the second controller 100 may determine whether the corresponding processing core is in a busy status S322. If the computation cycle is completed later than the memory cycle, the start of the computation cycle of the next tensor is unlikely to be delayed until the memory cycle is completed, i.e., a data starvation period is unlikely to occur.

At step S310, the priority assigned to the memory cycle of the tensor that are predicted not to experience a data starvation period, determined based on the first processing time and the second processing time, may be one of a low priority and a high priority.

At step S322, the first controller 1100 may assign a low priority if the corresponding processing core is in a busy status S333, i.e., it was predicted at step S310 that a data starvation period is unlikely to occur, and the confirmation that the NPU is in a busy status confirms that a data starvation period is unlikely to occur. Thus, at step S322, the first controller 1100 may determine that a data starvation period is highly unlikely to occur, based on the reason that the processing core is still computing, and may adjust the priority to a low priority.

At step S322, the first controller 1100 may assign the processing core a high priority if it is not in a busy status S322. In other words, it was predicted in step S310 that the data starvation period is unlikely to occur in the processing core, but in contrast to the prediction, it was confirmed that the processing core actually stopped working at step S322. Therefore, the corresponding processing cores can be determined as data starvation status DS and can be configured to be highly prioritized and provided with high bus bandwidth, i.e., the computation cycles and memory cycles for each tensor can be compared to first determine the probability of a data starvation period occurring, and then to determine in real-time whether a data starvation period actually occurs. Further, as the second processing time becomes relatively longer than the first processing time, the probability and the data starvation period occurring may become more prolonged. Accordingly, when a data starvation period occurs, the system may allocate higher bus bandwidth in a prioritized manner, and may then allocate the bus bandwidth differently according to a default priority or a lower priority based on the characteristics of the first processing time and the second processing time. The first processing time and the second processing time are unique characteristics that are determined according to the size of the parameters of the tensor of the neural network model and the complexity of the computation algorithm. Accordingly, the first processing time and the second processing time may be analyzed in advance during the compilation stage of the neural network model. In other words, the fourth example of the present disclosure may have the effect of providing optimal bus bandwidth distribution by taking into account both the static computation scheduling information analyzed in advance and the real-time bandwidth occupancy competition of various data communications occupying the actual bus.

In other words, the fourth example may allow for more granular prioritization so that bus bandwidth can be reallocated to allow for more efficient operations at the neural processing units.

Figure 14:
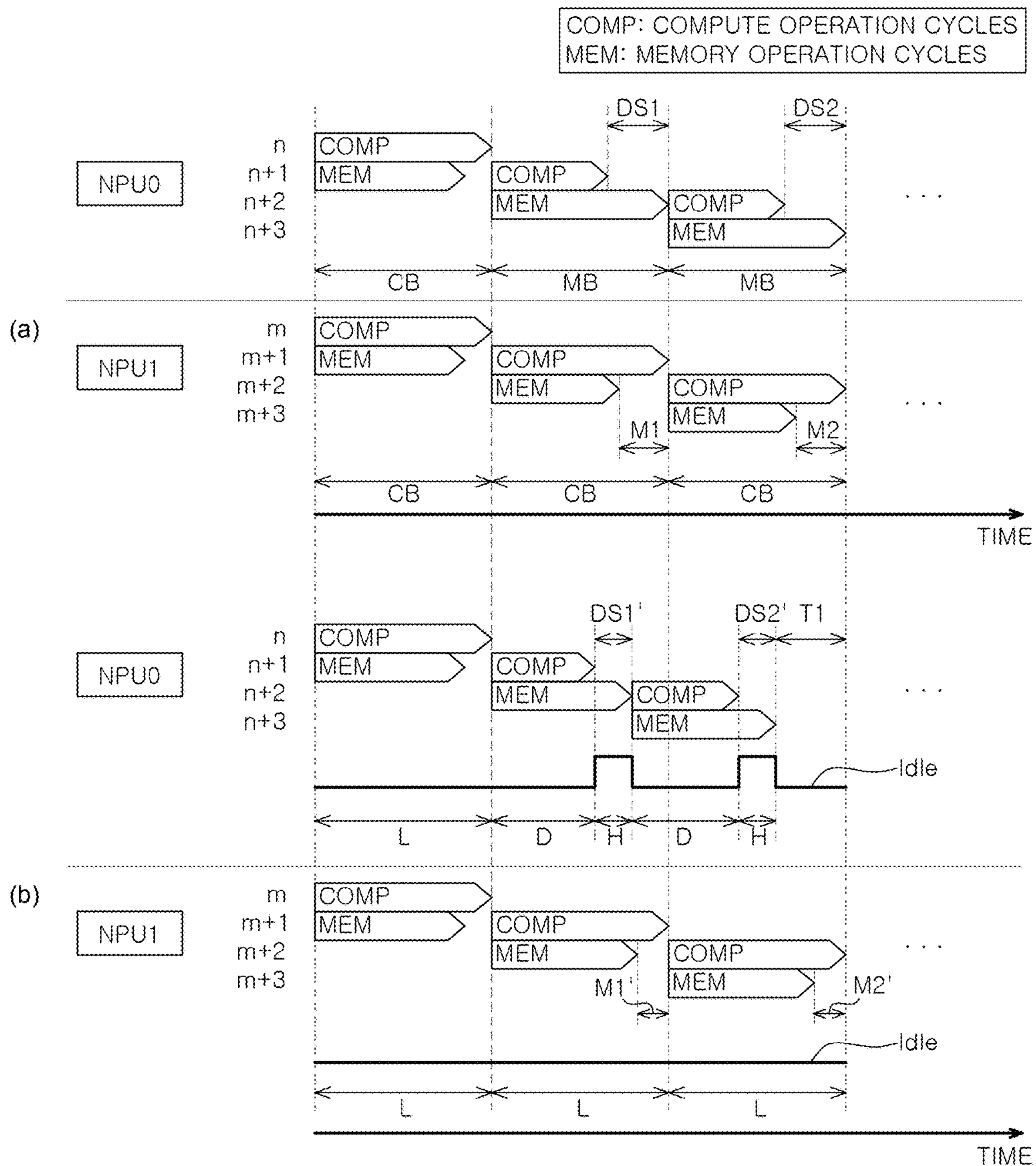
FIG. 14 is a diagram illustrating an improvement in data processing speed by giving priority to reduce a data starvation period, according to the fourth example of the present disclosure.

FIG. 14 is a diagram illustrating an improvement in data processing speed by giving priority to reduce a data starvation period, according to the fourth example. Referring to (a) of FIG. 14, a data starvation period may occur in some tensors of NPU0 if the control method according to the fourth example of the present disclosure is not applied. Specifically, a first data starvation period DS1 may occur from the completion of the computation cycle COMP of the first tensor n+1 of NPU0 to the completion of the memory cycle MEM of the second tensor n+2. Then, a second data starvation period DS2 may occur from the completion time of the computation cycle COMP of the second tensor n+2 of NPU0 to the completion time of the memory cycle MEM of the third tensor n+2, i.e., the tensor of the memory bound characteristic may have a data starvation period. On the other hand, as in (a), a data starvation period may not occur in NPU1 even if the control method according to the fourth example of the present disclosure is not applied. Specifically, the computation cycles of all tensors in NPU1 are longer than the memory cycles. In such a case, a data starvation period may not occur on NPU1, i.e., a tensor with a compute bound characteristic may not experience a data starvation period.

Referring to FIG. 13 and (a) of FIG. 14, the first controller according to the fourth example of the present disclosure may compare information on the computation cycle and memory cycles of each tensor processed on NPU0 and NPU1. That is, the first processing time and the second processing time of each tensor to be processed by each NPU may be compared. The processing time information may be part of the scheduling information of the neural network model. The processing time information may be information included in the respective neural network model, and is an initial value determined based on the tensor size. The second processing time may vary in real-time according to the real-time bandwidth allocation of the bus. A tensor having a first processing time greater than a second processing time may be determined as a compute bound CB interval. The tensor having a first processing time shorter than a second processing time may be determined as a memory bound MB interval. Specifically, since the computation cycle COMP of the first tensor n of NPU0 is completed before the memory cycle MEM of the first tensor n+1, it is determined to be the compute bound CB interval. Here, all tensors on NPU1 are also identified as compute bound CB intervals as an example. Since the computation cycles COMP of the first and second tensors n+1 and n+2 of NPU0 complete before the memory cycles MEM of the second and third tensors n+2 and n+3 of NPU0, the above tensors are identified as memory bound MB intervals and this may correspond to step S310 of FIG. 13.

Referring to FIG. 13 and (b) of FIG. 14, a system according to a fourth example of the present disclosure may be configured to generate a data starvation signal in real-time. The first controller may determine in real-time whether each processing core is in a data starvation status based on a data starvation signal IDLE generated by the second controller. The data starvation signal IDLE may be enabled when the NPU is not in a busy status and disabled when the NPU is in a busy status. The first controller may be configured to dynamically check for activation of the data starvation signal IDLE when processing a compute bound CB tensor. The first controller may be configured to dynamically check for activation of the data starvation signal IDLE when processing a memory bound MB tensor. Specifically, the data starvation signal IDLE for the zeroth tensor n and the first tensor n+1 intervals determined as the compute bound CB intervals of the NPU0 are disabled. The data starvation signal IDLE for the first tensor n+1 and the second tensor n+2 determined as the memory bound MB intervals of NPU0 was disabled, and then enabled after the computation cycle COMP of the first tensor n+1 was completed. The data starvation signal IDLE for the second tensor n+2 and the third tensor n+3 determined as the memory bound MB intervals of NPU0, was disabled and then enabled after the computation cycle COMP of the second tensor n+2 was completed. The data starvation signal IDLE for all tensor m, m+1, m+2, and m+3 determined as the compute bound CB intervals of NPU1 were disabled. This may correspond to steps S321 and S322 of FIG. 13.

Referring to FIG. 13 and (b) of FIG. 14, the system according to the fourth example may set the priority of the bus for the tensor of the memory bound BM characteristic to the default priority D when the data starvation signal IDLE is disabled and this may correspond to step S331 of FIG. 13. The system according to the fourth example may set the priority of the bus of the tensor of the compute bound CM characteristic to low priority L when the data starvation signal IDLE is disabled and this may correspond to step S333 of FIG. 13. The system according to the fourth example may set the priority of the bus of the corresponding tensor to high priority H when the data starvation signal IDLE is activated. If the data starvation signal IDLE is activated, the first controller may assign the high priority H to the tensor corresponding to the data starvation signal IDLE without considering memory bounds or compute bound characteristics and this may correspond to step S332 of FIG. 13. The data starvation signal was described above with reference to FIG. 11.

The benefit according to the fourth example of the present disclosure will be described with reference to (b) of FIG. 14. (a) of FIG. 14 describes the case before the present disclosure is applied, and (b) of FIG. 14 describes the case after the fourth example of the present disclosure is applied.

When a plurality of tensors compete for bandwidth on a bus of the system according to the fourth example of the present disclosure, the bus may be configured to allocate relatively higher bandwidth to tensors that have a relatively higher priority. For example, the bus may allocate higher bandwidth to memory-bound tensors than to compute-bound tensors. Thus, if a low priority tensor and a normal priority tensor are competing on the bus, the bus may be configured to process the normal priority tensor first. For example, the bus may allocate higher bandwidth to memory bound tensors than to compute bound tensors. Therefore, if a low priority tensor and a normal priority tensor are competing on the bus, the bus may be configured to process the normal priority tensor first. For example, if a memory bound tensor and a compute bound tensor are competing on the bus, the bus can reorder the order-queue to process the memory bound tensor first. Additionally, memory bound MB tensors can be determined to be insufficient in memory bandwidth because the computation cycle COMP is shorter than the corresponding memory cycle MEM. The compute bound CB tensors can be determined to be free in memory bandwidth because the computation cycle COMP is longer than the corresponding memory cycle MEM. The duration of memory cycles for certain tensors with increased bandwidth may be decreased, and conversely, the duration of memory cycles for certain tensors with decreased bandwidth may be increased.

Referring to (a) of FIG. 14 and (b) of FIG. 14, a memory cycle MEM interval of the first tensor n+1 of NPU0 is identified as a compute bound CB interval, and the first controller assigns a low priority L to the memory cycle MEM of the first tensor n+1 based on the data starvation signal IDLE. The memory cycle MEM interval of the first tensor m+1 of the NPU1 competing with the above tensor is identified as a compute bound CB interval, and the first controller assigns a low priority L to the memory cycle MEM of the first tensor m+1 based on the data starvation signal IDLE. In such a case, since the bus priorities of the memory access operations of the first tensor n+1 of NPU0 and the first tensor m+1 of NPU1 competing with each other are equal to each other, in (b) according to the fourth example of the present disclosure as compared to (a), NPU0 and NPU1 have not ceded or received bus bandwidth from each other, and thus there may be no substantial change in the memory cycles of NPU0 and NPU1.

A memory cycle MEM interval of the second tensor n+2 of NPU0 is identified as a memory bound MB interval, and the first controller assigns a default priority D to the memory cycle MEM of the second tensor n+2 based on the data starvation signal IDLE, and then assigns a high priority H when the data starvation signal IDLE is activated. The memory cycle MEM interval of the second tensor m+2 of NPU1 competing with the above tensor is identified as a compute bound CB interval, and the first controller assigns a low priority L to the memory cycle MEM of the second tensor m+2 based on the data starvation signal IDLE. The priority of the memory cycle MEM of the second tensor n+2 of NPU0 is a default priority D, and the priority of the memory cycle MEM of the second tensor m+2 of NPU1 is a low priority L. Accordingly, in (b) according to the fourth example of the present disclosure as compared to (a), NPU0 may cede a predetermined bus bandwidth to NPU1, or the order-queue of the bus may be reordered according to the priorities of NPU0 and NPU1. In such a case, the duration of the memory cycle MEM of the second tensor n+2 of NPU0 is decreased, and the duration of the memory cycle MEM of the second tensor m+2 of NPU1 is increased, and when the computation cycle COMP of the first tensor n+1 of NPU0 is completed, a data starvation signal IDLE is activated in NPU0, and the priority of the memory cycle MEM of the second tensor n+2 of NPU0 is changed to a high priority H. Thus, in (b) according to the fourth example of the present disclosure compared to (a), NPU0 cedes a larger amount of bus bandwidth to NPU1. In such a case, the duration of the memory cycle MEM of the second tensor n+2 of NPU0 is further reduced, and the duration of the memory cycle MEM of the second tensor m+2 of NPU1 is further increased.

Accordingly, the first data starvation period DS1 in (a) of the NPU0 is reduced to the first data starvation period DS1' in (b), and the processing speed of the NPU0 is improved. Meanwhile, the duration of the memory cycle MEM of the second tensor m+2 of NPU1 is increased, and the first interval M1 with sufficient bandwidth of (a) is also reduced to the first interval M1' with sufficient bandwidth of (b). Even though the interval of the memory cycle MEM of the second tensor m+2 of NPU1 is increased, the computation time of NPU1 is not delayed because there is sufficient bandwidth to be ceded. Accordingly, ceding some of the bus bandwidth allocated to NPU1 to NPU0 has the effect of maintaining the computation speed of NPU1.

A memory cycle MEM interval of the third tensor n+3 of NPU0 is identified as a memory bound MB interval, and the first controller assigns a default priority D to the memory cycle MEM of the third tensor n+3 based on the data starvation signal Idle, and then assigns a high priority H when the data starvation signal IDLE is activated. The memory cycle MEM interval of the third tensor m+3 of NPU1 competing with the above tensor is identified as a compute bound CB interval, and the first controller assigns a low priority L to the memory cycle MEM of the third tensor m+3 based on the data starvation signal IDLE. That is, the priority of the memory cycle MEM of the third tensor n+3 of NPU0 is a default priority D, and the priority of the memory cycle MEM of the third tensor m+3 of NPU1 is a low priority L. Accordingly, in (b) according to the fourth example of the present disclosure as compared to (a), NPU0 may cede a predetermined bus bandwidth to NPU1, or the order-queue of the bus may be reordered according to the priorities of NPU0 and NPU1. In such a case, the duration of the memory cycle MEM of the third tensor n+3 of NPU0 is decreased, and the duration of the memory cycle MEM of the third tensor m+3 of NPU1 is increased. Here, when the computation cycle COMP of the second tensor n+1 of NPU0 is completed, a data starvation signal IDLE is activated in NPU0, and the priority of the memory cycle MEM of the third tensor n+3 of NPU0 is changed to a high priority H. Thus, in (b) according to the fourth example of the present disclosure compared to (a), NPU0 cedes a larger amount of bus bandwidth to NPU1. In such a case, the interval of the memory cycle MEM of the third tensor n+3 of NPU0 is further reduced, and the interval of the memory cycle MEM of the third tensor m+3 of NPU1 is further increased. Accordingly, the second data starvation period DS2 of NPU0 in (a) is reduced to the second data starvation period DS2' in (b). Thus, the processing speed of NPU0 may be improved. Meanwhile, the duration of the memory cycle MEM of the third tensor m+3 of NPU1 is increased, and the second interval M2 with sufficient bandwidth of (a) is also reduced to the second interval M2' with sufficient bandwidth of (b). Even though the interval of the memory cycle MEM of the third tensor m+3 of NPU1 is increased, the computation time of NPU1 is not delayed because there is sufficient bandwidth to be ceded. Accordingly, even if the bus bandwidth allocated to NPU1 is partially ceded to NPU0, it has the effect of maintaining the computation speed of NPU1.

In other words, the system according to the fourth example may be assign one of, based on information in the neural network model, a first priority (e.g., a low priority L) or a second priority (e.g., a default priority D) to each tensor of the neural network model, and further assign a third priority based on a first signal (e.g., a data starvation signal) generated by a neural processing unit processing the respective tensor. The third priority is a higher priority than the first or second priority, and the bus may send the data of the tensor of the third priority before the data of the tensor of the first or second priority. The second priority is a higher priority than the first priority, and the bus may send the tensor data of the second priority before the tensor data of the first priority. The first priority and the second priority may be determined based on information obtained in advance, and the third priority may be dynamically determined based on the dynamically generated first signal. Accordingly, the system according to a fourth example of the present disclosure may be configured to adjust the priority of the bus for a particular interval of each tensor being processed in real-time to reduce data starvation periods of the neural network model being processed on at least one of the plurality of processing cores.

According to the fourth example, by first comparing cycles for computation operations and memory access operations for each tensor of the neural processing unit 1000 to identify a data starvation period (e.g., corresponding to the first example), and then further identifying and dynamically prioritizing the data starvation status of each processing core (e.g., corresponding to the second and third examples), the data starvation period can be reduced more efficiently.

According to the present disclosure described above, based on a control system including a plurality of neural processing units, prioritized QoS for read operations and write operations for accessing a memory of each neural processing unit can be applied to enable efficient operation between the read operations and write operations in the course of a DMA operation.

Further, according to the present disclosure, when a data starvation period is predicted to occur because the time required to complete the memory access operation is shorter or longer than the time required to complete the computation operation, the bus bandwidth can be reallocated according to the prioritized QoS to enable the calculation circuit to operate without the data starvation period, thereby improving data processing performance and reducing power consumption.

Furthermore, according to the present disclosure, by applying a high priority to NPU0 and a low priority to NPU1 for a tensor at a certain point in time, the bus bandwidth of NPU1 can be ceded to NPU0 to reduce the duration of the data starvation period.

According to an example of the present disclosure, a system for controlling a processing core may be provided. The system may comprise at least one processing core processes computations of the at least one neural network model comprising at least one tensor, at least one memory circuit configured to store the at least one tensor, a bus circuit, electrically coupled to the at least one processing core and the at least one memory circuit, transmits the at least one tensor based on a memory access operation instruction, and a controller controls a priority of a memory access operation for each tensor of the at least one processing core.

The bus circuit may be configured to transmit the at least one tensor from the at least one memory to the at least one processing core.

The controller may be configured to determine a memory cycle and a computation cycle of the at least one tensor assigned to the at least one processing core.

The controller may be configured to compare a computation cycle of the at least one tensor with a memory cycle of a subsequent tensor of the at least one tensor.

The at least one processing core may comprise a first processing core and a second processing core. The controller may be configured to increase bus bandwidth of the first processing core by decreasing the bus bandwidth of the second processing core when a data starvation period occurs in the first processing core.

The at least one processing core may comprise a first processing core and a second processing core. The controller may be configured to increase a priority of tensors of the first processing core so as to increase bus bandwidth allocated to the tensors processed by the first processing core when a data starvation period occurs on the first processing core.

The controller may be configured to control the bus circuit to cede at least a portion of bus bandwidth allocated to the at least one processing core when a tensor processed by the at least one processing core is in a compute bound interval.

The controller may be configured to determine a prioritization of the at least one processing core based on a data starvation signal.

The system may include a counter for determining a data starvation status. The system may be configured to determine the data starvation status by comparing a counter value of the counter with a preset counter threshold.

At least one processing core may comprise a plurality of processing elements (PEs). The plurality of PEs may include at least one of a multiply and accumulate (MAC) operator, an adder tree, or an arithmetic logic unit (ALU) operator.

According to an example of the present disclosure, a method for controlling a processing core processed by an apparatus may be provided. The method may comprise: determining a data starvation period of at least one tensor based on a computation cycle of the at least one tensor processed by at least one processing core and a memory cycle of a subsequent tensor; and controlling, based on the data starvation period, a prioritization of a memory access operation of the at least one tensor on a bus.

A computation operation and a memory access operation with respect to the at least one tensor may be performed on a basis of bus bandwidth provided for the at least one processing core to communicate with the memory.

Determining a data starvation period may include: determining the memory cycle of the at least one tensor; and determining the computation cycle of the subsequent tensor.

Controlling the prioritization on the bus may include: adjusting bus bandwidth of the memory cycle.

The at least one processing core may include a first processing core and a second processing core. Controlling the prioritization of on the bus may includes: ceding at least a portion of bus bandwidth allocated to the first processing core to the second processing core.

Controlling the prioritization may comprise: prioritizing the at least one tensor based on a data starvation signal.

Determining the data starvation period may be configured to determine the data starvation status by comparing a counter value of a counter with a preset counter threshold.

Controlling the prioritization of the memory access operation of the at least one tensor on the bus may be configured to increase bus bandwidth of a memory bound tensor.

Controlling the prioritization of the bus may include: prioritizing the memory access operation of the at least one tensor. The prioritization may include a first to third priority. The second priority may be a higher priority than the first priority. The third priority may be a higher priority than the first priority and the second priority, According to an example of the present disclosure, a system may be provided. The system may comprise: at least one neural processing unit configured to process computations of the at least one neural network model comprising at least one tensor, at least one memory circuit configured to store the at least one tensor, a bus circuit, electrically coupled to the at least one neural processing unit and the at least one memory circuit, configured to transmit the at least one tensor based on a memory access operation instruction, and a controller configured to control a priority of a memory access operation for each tensor of the at least one neural processing unit.

The examples of the present disclosure disclosed herein and in the drawings are provided solely to explain the technical content of the present disclosure and to facilitate understanding of the present disclosure, and are not intended to limit the scope of the present disclosure.

NATIONAL R&D PROJECT SUPPORTING THIS INVENTION

[Project Identification Number] 1711193247
[Task Number] 2022-0-00248-002
[Name of Ministry] Ministry of Science and ICT
[Name of Task Management (Specialized) Institution] Institute of Information & Communications Technology Planning & Evaluation
[Research Project Title] PIM Artificial Intelligence Semiconductor Core Technology Development (Design)
[Research Task Name] Development of CXL-based PIM Semiconductor Technology for Multi-DRAM Modules Considering Memory Consistency
[Name of the organization performing the task] DeepX Co., Ltd.
[Research Period] 2023.01.01~2023.12.31

What is claimed is:

1. A system comprising:

at least one processing core configured to perform computation operations of at least one neural network model associated with tensors;

at least one memory circuit configured to store the tensors;

a bus circuit operably coupled to the at least one processing core and the at least one memory circuit, the bus circuit configured to send the tensors from the at least one memory circuit to the at least one processing core responsive to receiving requests for memory access operations; and a controller operably coupled to the bus circuit, the controller configured to determine a priority of a memory access operation of each of the tensors and control the bus circuit to send each of the tensors to the at least one processing core according to the determined priority.

2. The system of claim 1, wherein the controller is configured to determine the priority of the memory access operation of each of the tensors by comparing lengths of memory cycles using the bus circuit and lengths of computation cycles of the tensors.

3. The system of claim 2, wherein the controller is further configured to control one or more quality of service parameters associated with the bus circuit according to the determined priority of the memory access operation of each of the tensors.

4. The system of claim 1, wherein the controller is configured to determine the priority of the memory access operation of each of the tensors by at least comparing a computation cycle of a first tensor of the tensors at a processing core with a memory cycle of a second tensor subsequent tensor of the tensors.

5. The system of claim 1, wherein the controller is configured to increase bus bandwidth allocated to a first processing core of the at least one processing core by decreasing the bus bandwidth allocated to a second processing core of the at least one processing core responsive to determining that a data starvation period is predicted to occur or has occurred in the first processing core.

6. The system of claim 1, wherein the controller is configured to increase a priority of sending tensors of a first processing core of the at least one processing core to increase bus bandwidth allocated to the first processing core responsive to determining that a data starvation period is predicted to occur or has occurred in the first processing core.

7. The system of claim 1, wherein the controller is configured to control the bus circuit to cede at least a portion of bandwidth of the bus circuit allocated to the at least one processing core responsive to determining that the at least one processing core is in a compute bound status.

8. The system of claim 1, wherein the controller is configured to determine priority of sending tensors to the at least one processing core via the bus circuit responsive to receiving a data starvation signal.

9. The system of claim 1, further comprising a counter for determining a data starvation status, wherein whether the at least one processing core is in the data starvation status is determined by comparing a counter value of the counter with a preset counter threshold.

10. The system of claim 1, wherein each of the at least one processing core comprises a plurality of processing elements (PEs), wherein the plurality of PEs include at least one of a multiply and accumulate (MAC) operator, an adder tree, or an arithmetic logic unit (ALU) operator.

11. A method comprising:

determining whether a data starvation has occurred or is predicted to occur in at least one processing core configured to perform computation operations of at least one neural network model associated with tensors;

determining a priority of memory access operations of each of the tensors via a bus circuit responsive to determination of whether the data starvation has occurred or is predicted to occur in the at least one processing core;

assigning bandwidth of the bus circuit for sending each of the tensors to the at least one processing core according to the determined priority; and sending each of the tensors to the at least one processing core via the bus circuit according to the bandwidth of the bus circuit assigned to send each of the tensors to the at least one processing core.

12. The method of claim 11, wherein the determining whether the data starvation has occurred or is predicted to occur in at least one processing core comprises comparing a computation cycle of a first tensor to be processed by the at least one processing core and a memory cycle for sending a second tensor to the at least one processing core via a bus circuit, the second tensor processed by the at least one processing core subsequent to the first tensor.

13. The method of claim 11, wherein the assigning of bandwidth comprises controlling one or more quality of service parameters associated with the bus circuit according to the determined priority of the memory access operation of each of the tensors.

14. The method of claim 11, wherein the determining of whether the data starvation has occurred or is likely to occur comprises determining a memory cycle of a first tensor of the tensors, and determining a computation cycle of a second tensor of the tensors subsequent to the first tensor.

15. The method of claim 11, wherein the assigning of the bandwidth comprises reassigning at least a portion of bus bandwidth allocated to a first processing core of the at least one processing core to a second processing core of the at least one processing core.

16. The method of claim 11, wherein the determining of the priority comprises prioritizing sending of at least one of the tensors based on a data starvation signal indicating that processing elements in the at least one processing core is idle.

17. The method of claim 11, wherein the determining of whether the data starvation has occurred or is likely to occur comprises comparing a counter value of a counter with a preset counter threshold.

18. The method of claim 11, wherein assigning the bandwidth of the bus circuit comprises increasing bus bandwidth to send a tensor that is memory bound by the at least one processing core.

19. The method of claim 11, wherein the priority of the memory operations of each of the tensors is one of a first priority, a second priority higher in priority than the first priority, or a third priority higher in priority than the second priority.

20. A system comprising:

at least one neural processing unit configured to perform computation operations of at least one neural network model associated with tensors;

at least one memory circuit configured to store the tensors;

a bus circuit operably coupled to the at least one neural processing unit and the at least one memory circuit, the bus circuit configured to send the tensors from the at least one memory circuit to the at least one neural processing unit responsive to receiving requests for memory access operations; and a controller operably coupled to the bus circuit, the controller configured to determine a priority of a memory access operation of each of the tensors and control the bus circuit to send each of the tensors to the at least one neural processing unit according to the determined priority.

* * * * *